(12) United States Patent
Hirabayashi

(10) Patent No.: US 7,760,377 B2
(45) Date of Patent: Jul. 20, 2010

(54) IMAGE PRINTING SYSTEM AND IMAGE DELIVERY DEVICE AND IMAGE PRINTING DEVICE USED THEREIN

(75) Inventor: Shinji Hirabayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1313 days.

(21) Appl. No.: 10/898,942

(22) Filed: Jul. 27, 2004

(65) Prior Publication Data

US 2005/0002058 A1 Jan. 6, 2005

Related U.S. Application Data

(63) Continuation of application No. PCT/JP03/00780, filed on Jan. 28, 2003, now abandoned.

(30) Foreign Application Priority Data

Jan. 28, 2002 (JP) ............... 2002-018876
Jan. 29, 2002 (JP) ............... 2002-020455

(51) Int. Cl.
*G06F 3/12* (2006.01)
*G06F 3/13* (2006.01)
*G06F 3/14* (2006.01)

(52) U.S. Cl. .............. 358/1.15; 358/1.16; 358/1.17; 358/1.18; 358/403; 358/527

(58) Field of Classification Search ....... 358/1.15–1.18, 358/403, 537
See application file for complete search history.

(56) References Cited

U.S. PATENT DOCUMENTS

| | | | |
|---|---|---|---|
| 5,615,015 A | 3/1997 | Krist et al. | |
| 6,029,238 A | 2/2000 | Furukawa | |
| 6,307,640 B1 * | 10/2001 | Motegi | 358/1.14 |
| 6,327,049 B1 | 12/2001 | Ohtsuki | |
| 6,522,418 B2 * | 2/2003 | Yokomizo et al. | 358/1.15 |
| 2001/0021311 A1 | 9/2001 | Mizumo | |
| 2001/0042086 A1 | 11/2001 | Ueda et al. | |
| 2001/0046067 A1 | 11/2001 | Taniguchi | |
| 2002/0030834 A1 * | 3/2002 | Watanabe et al. | 358/1.9 |

FOREIGN PATENT DOCUMENTS

EP 0 917 006 A2 5/1999

(Continued)

*Primary Examiner*—King Y Poon
*Assistant Examiner*—Lawrence E Wills
(74) *Attorney, Agent, or Firm*—Sughrue Mion, PLLC

(57) ABSTRACT

When the user gives a printing instruction of an image delivered in response to the user's selection and edited, the image printing system of the invention retrieves available printers for printing the image, based on the ink type suitable for printing the image and an input paper size, and displays a list of the retrieved available printers on the user's Web browser. In response to the user's selection of a desired printer out of the list, the image printing system inputs a captured image, which is obtained by capturing the edited image, as a check image and the user's settings of editing parameters via the Internet and sends the check image and the user's settings of the editing parameters to a computer in a printing center where the selected printer is located. The computer displays a resized edited image and the check image in a comparable manner to confirm their consistency, prior to printing the edited image.

7 Claims, 18 Drawing Sheets

FOREIGN PATENT DOCUMENTS

| | | |
|---|---|---|
| EP | 1 120 730 A | 8/2001 |
| EP | 0 860 986 B1 | 10/2004 |
| EP | 1 471 720 A1 | 10/2004 |
| EP | 1 603 320 A2 | 12/2005 |
| JP | 5-73570 A | 3/1993 |
| JP | 10-313399 A | 11/1998 |
| JP | 11-167594 A | 6/1999 |
| JP | 11-194903 A | 7/1999 |
| JP | 11-242544 A | 9/1999 |
| JP | 2000-066984 A | 3/2000 |
| JP | 2000-148425 A | 5/2000 |
| JP | 2000-155666 A | 6/2000 |
| JP | 2001-103228 A | 4/2001 |
| JP | 2001-256366 A | 9/2001 |
| JP | 2001-296987 A | 10/2001 |
| JP | 4110785 B2 | 4/2008 |

* cited by examiner

Fig. 6

| Selection and Settings of Printer | |
|---|---|
| Select Paper and Paper Feed | PRINT |

Paper Size : A4 210×297mm
Direction : ⊙ Portrait  ○ Landscape
Paper Type : Superfine
Paper Feed : Auto Sheet Feeder A4  A  297mm  210mm Next  End

IMAGE PRINTING SYSTEM AND IMAGE DELIVERY DEVICE AND IMAGE PRINTING DEVICE USED THEREIN

CROSS REFERENCE TO RELATED APPLICATION

This is a continuation of Application No. PCT/JP03/00780, filed on Jan. 28, 2003, now abandoned.

BACKGROUND OF THE INVENTION

1. Technical Field

The present invention relates to an image printing system, an image printing method, an image delivery device, image printing device and corresponding programs. More specifically, the invention relates to an image printing system and an image printing method that print an image selected by a user via a communication network, an image delivery device that delivers an image selected by a user via a communication network, an image printing device that prints an image which is delivered to and edited by a user, and programs used for the image delivery device and the image printing device.

2. Description of the Prior Art

A proposed image printing system enables the user to select either a home print mode that prints an image selected among multiple images by the user via the Internet with the user's own printer or a delivery print mode that prints the selected image in a printing center and receives delivery of the printed image. In response to the user's selection of the home print mode, the image printing system delivers the selected image in a size suitable for the user's printer, allows the user to edit the delivered image within the range of the copyright holder's permission, and prints the edited image with the user's computer. In response to the user's selection of the delivery print mode, on the other hand, the image printing system requests the user to enter a preset paper size and settings for editing, prints the selected image in the printing center, based on the input paper size and the input settings for editing, and delivers the resulting print.

When the user selects the delivery print mode, however, this prior art image printing system does not inform the user of the performances of the printer used for printing the selected image. The resulting print may thus not have desired picture quality. The user is also not notified of the expected time of delivery of the resulting print, since the order status in the printing center is unknown.

In the case of editing the selected image and printing the edited image in the printing center, the prior art image printing system has a potential problem that the printed image on the resulting print in the printing center may be different from the image edited by the user. A typical procedure of printing an edited image in the printing center sends only the user's settings of the editing parameters to the printing center, in order to print an image of a larger size than the size of a layout image used for editing by the user. The printing center edits an image in a suitable size for printing with the settings of the editing parameters and prints the edited image. Some communication trouble or failure or the settings for editing the image of the different size may cause the image edited in the printing center to be inconsistent with the image edited by the user.

The image printing system and the image delivery device of the invention aim to allow the user to select a desired printer for printing an image. The image printing system and the image delivery device of the invention also aim to notify the user of the current status of a selected printer for printing the image.

The image printing system, the image printing method, the image delivery device, and the image printing device of the invention aim to print an image selected and edited by the user with high reliability via a communication network. The image printing system, the image printing method, the image delivery device, and the image printing device of the invention also aim to confirm the adequacy of editing, prior to printing an image selected and edited by the user via a communication network.

The program of the invention aims to make the computer function as an image delivery device, which allows the user to select a desired printer for printing an image and notifies the user of the current status of a selected printer for printing the image. The program of the invention also aims to make the computer function as an image delivery device and an image printing device, which are used to print an image selected and edited by the user with high reliability via a communication network. The program of the invention further aims to make the computer function as an image delivery device and an image printing device, which confirm the adequacy of editing, prior to printing an image selected and edited by the user via a communication network.

SUMMARY OF THE INVENTION

In order to achieve at least part of the above aims, an image printing system, an image printing method, an image delivery device, an image printing device, and corresponding programs are constructed as follows.

A first image printing system of the invention includes: an image delivery device that connects with a client computer linked to a printer via a communication network and delivers an image to the client computer; and an image printing device that connects with the image delivery device via the communication network and has a large-size printer. The image delivery device in the first image printing system includes: an image storage module that stores multiple images in a first size and multiple resized images, which are obtained by resizing the multiple images to a second size smaller than the first size, with identification information; a selected image receiving module that outputs an image selection window, which displays the multiple resized images stored in the image storage module in a selectable manner to allow for selection by the client computer, to the client computer and receives selection of a selected image on the image selection window from the client computer; a printing condition receiving module that receives printing conditions, which include a print mode selection condition of selecting either a home print mode to print the selected image received by the selected image receiving module with the printer linked to the client computer or a delivery print mode to print the selected image with the large-size printer of the image printing device and to deliver the printed image; and an image delivery transmission module that delivers an image in the first size corresponding to the selected image to the client computer, in the case of setting the home print mode to the print mode selection condition out of the printing conditions received by the printing condition receiving module, while sending identification information and the printing conditions with regard to an image corresponding to the selected image to the image printing device, in the case of setting the delivery print mode to the print mode selection condition out of the printing conditions received by the printing condition receiving module. The image printing device of the first printing system includes: an image storage module that stores multiple images in a third size greater than the first size, which are identical to the multiple images in the first size, with identification information; and a print control module that controls a printing operation, in response to reception of identification information and printing conditions from the image delivery transmission module of the image delivery device, to print an object image specified by the received identification information, out of the multiple images stored in the image storage module, under the received printing conditions with the large-size printer.

The first image printing system of the invention outputs the image selection window including the multiple images in the smaller second size to the client computer for selection of a desired image. This structure ensures quick output of the image election window to the client computer for selection of a desired image. The image delivery device stores the multiple images in the first size, which are suitable for printing with the printer linked to the client computer. In the case of setting the home print mode to the print mode selection condition, an image in the first size corresponding to the selected image is immediately delivered to the client computer. The image printing device stores the multiple images in the third size, which are suitable for printing with the large-size printer, with their identification information. A printing instruction sent from the image delivery device to the image printing device is thus required to include only the identification information and the printing conditions. Namely time-consuming transmission of an image file itself is not required. This arrangement enables a printing instruction to be instantly given to the image printing device. The client computer (the user) is allowed to select either the home print mode that prints an image with the printer linked to the client computer or the delivery print mode that prints an image by the image printing device and receives delivery of the printed image. The user can thus obtain a favorably-sized, high-quality resulting print of the selected image.

In one preferable embodiment of the first image printing system of the invention, the image delivery transmission module of the image delivery device distributes a sample print image, which includes the image in the first size corresponding to the selected image and a specified character string, mark, or image, to the client compute, in the case of setting the home print mode to the print mode selection condition out of the printing conditions received by the printing condition receiving module, and subsequently delivers the image in the first size to the client computer in response to a request from the client computer. The client computer (the user) is allowed to carry out actual printing, after sample printing that prints the sample printing image with the printer. The user can thus check the total impression and the picture quality of the selected image printed in the home print mode, prior to actual printing.

In one preferable embodiment of the first image printing system of the invention, the image delivery device further includes: a program storage module that stores a printing program, which is downloaded into the client computer and is automatically installed therein to control printing of a delivered image with the printer linked to the client computer in response to an instruction from the image delivery device; and a download control module that controls download of the printing program into the client computer after reception of the selected image by the selected image receiving module but prior to delivery of the image in the first size corresponding to the selected image by the image delivery transmission module to the client computer. This ensures management of image printing by the client computer. In the above embodiment, the printing program may be capable of editing an image. In this embodiment, further, the printing program may be used to enter printing conditions with regard to the selected image.

In one preferable embodiment of the first image printing system of the invention, the image delivery device is connected to plurality of the image printing devices via the communication network, and further includes: a printer retrieval module that retrieves available printers for printing the selected image, out of plurality of large-size printers included in the plurality of the image printing devices and the printer linked with the client computer; and a printer acceptance module that outputs a printer selection window to the client computer to display a list of the retrieved available printers in a selectable manner to allow for selection by the client computer and accepts selection of a selected printer on the printer selection window from the client computer. In the image delivery device of this embodiment, the printing condition receiving module sets the print mode selection condition according to the selected printer accepted by the printer acceptance module, and the image delivery transmission module carries out delivery or transmission to print the selected image with the selected printer accepted by the printer acceptance module. This arrangement more adequately manages image printing by the client computer (the user).

In another preferable embodiment of the first image printing system of the invention, the image delivery device further includes information image receiving module that receives editing information with regard to editing of the selected image from the client computer, as well as a captured image obtained by capturing the selected image edited by the client computer as a check image. In this embodiment, the image delivery transmission module of the image delivery device sends the editing information and the check image, in addition to the identification information and the printing conditions with regard to the image corresponding to the selected image, to the image printing device, in the case of setting the delivery print mode to the print mode selection condition out of the printing conditions received by the printing condition receiving module, the print control module of the image printing device edits the object image, which is specified by the received identification information, with the editing information sent from the image delivery transmission module of the image delivery device to prepare a printing image, outputs the prepared printing image and the received check image in a comparable manner, and controls a printing operation, in response to a print confirmation in answer to the output in the comparable manner, to print an identical image to the prepared printing image under the received printing conditions with the large-size printer. This arrangement enables the results of editing carried out by the client computer (the user) to be confirmed, based on the comparison between the check image and the printing image, prior to printing the selected image by the image printing device. In one preferable application of this embodiment, the print control module of the image printing device may output the check image and a resized printing image, which is obtained by resizing the prepared printing image to an identical size with that of the check image, as a display on one screen page or a printout on one sheet of printing paper. This arrangement enables the results of editing to be confirmed, based on the comparison between the check image and the resized printing image in the identical size, prior to printing the selected image by the image printing device.

In another preferable embodiment of the first image printing system of the invention, the image delivery device further includes: information image receiving module that receives editing information with regard to editing of the selected image from the client computer, as well as a captured image obtained by capturing the selected image edited by the client computer as a check image; a printing image preparation module that edits the object image, which is specified by the received identification information, with the editing information to prepare a printing image; and a check image output module that outputs a check window including the prepared printing image and the received check image to the client computer. In this embodiment, the image delivery transmission module of the image delivery device, in response to a confirmation from the client computer on the check window output from the check image output module to the client computer, delivers the image in the first size corresponding to the selected image to the client computer or sends the identification information and the printing conditions with regard to the image corresponding to the selected image to the image printing device, based on the printing conditions received by the printing condition receiving module. This arrangement also enables the results of editing carried out by the client computer (the user) to be confirmed, based on the comparison between the check image and the printing image, prior to printing the selected image by the image printing device. In one preferable application of this embodiment, the image delivery transmission module of the image delivery device may send the editing information and the check image, in addition to the identification information and the printing conditions with regard to the image corresponding to the selected image, to the image printing device, in the case of setting the delivery print mode to the print mode selection condition out of the printing conditions received by the printing condition receiving module. And the print control module of the image printing device may edit the object image, which is specified by the received identification information, with the editing information sent from the image delivery transmission module of the image delivery device to prepare a printing image, output the prepared printing image and the received check image in a comparable manner, and control a printing operation, in response to a print confirmation in answer to the output in the comparable manner, to print an identical image to the prepared printing image under the received printing conditions with the large-size printer.

A second image printing system of the present invention prints an image selected by a user via a communication network, the second image printing system including: an image storage module that stores multiple images; an image delivery module that delivers a selected image by the user out of the stored multiple images to the user; multiple printing units that are capable of printing an image; a retrieval module that, in response to a printing instruction of an object image, which is either the delivered image or an edited image obtained by editing the delivered image, from the user, retrieves available printing units for printing the object image specified by the printing instruction, out of the multiple printing units; a display output module that outputs a display of the retrieved available printing units in a selectable manner to allow for selection by the user; and a printing information output module that, in response to the user's selection of a selected printing unit on the display of the retrieved available printing units, outputs required printing information to the selected printing unit to print the object image specified by the printing instruction with the selected printing unit.

In response to the user's printing instruction to print an object image, which is either a delivered image or an edited image obtained by editing the delivered image, the second image printing system of the invention retrieves the available printing units for printing the object image specified by the printing instruction, out of the multiple printing units. The second image printing system then outputs a display of the retrieved available printing units in a selectable manner to allow for selection by the user. In response to the user's selection of a selected printing unit on the display of the available printing units, required printing information is output to the selected printing unit to print the object image specified by the printing instruction with the selected printing unit. This arrangement enables the user to select a desired printing unit for printing the delivered image or the edited image as the object image.

As one construction of the second image printing system of the invention, the image storage module, the image delivery module, the retrieval module, the display output module, and the printing information output module may be incorporated in an image delivery server, and the multiple printing units may be located at multiple different positions that are in a communicable range with the image delivery server. Thus, the image delivery server and the multiple printing units may be located at different positions.

In one preferable embodiment of the second image printing system with the image delivery server mentioned above, the image delivery server has a status management module that manages statuses of the multiple printing units, and the retrieval module retrieves the available printing units for printing the object image specified by the printing instruction, based on the statuses of the multiple printing units managed by the status management module. This arrangement ensures output of a display of the retrieved available printing units on the basis of the statuses of the printing units.

In one preferable application of this embodiment, the display output module may output a display of statuses of the retrieved available printing units. In this case, the display output module may receive the user's request for displaying status of a specified printing unit and output a display of the status of the specified printing unit. This enables the display of the status of a printing unit to be output, according to the user's requirement.

In one preferable application of the embodiment, the status management module may manage at least one of settings of ink type, paper type, and paper size in the multiple printing units as part of the statuses of the multiple printing units. This enables settings of ink type, paper type, or paper size in the multiple printing units to be displayed to the user, as part of the statuses of the printing units.

In another preferable application of the embodiment, the status management module may manage printing states of the multiple printing units as part of the statuses of the multiple printing units. This enables the printing states of the printing units to be displayed to the user, as part of the statuses of the printing units. Here the 'printing state' includes the volume of queuing prints (queuing jobs) to be printed by each of the multiple printing units.

In still another preferable application of the embodiment, the status management module may manage the locations of the multiple printing units as part of the statuses of the multiple printing units. This enables the locations of the printing units to be displayed to the user, as part of the statuses of the printing units.

A first delivery device of the present invention delivers an image selected by a user via a communication network to the user, the first image delivery device including: an image storage module that stores multiple images; an image delivery module that delivers a selected image by the user out of the stored multiple images to the user; a status management module that manages statuses of multiple printing devices; a retrieval module that, in response to a printing instruction of an object image, which is either the delivered image or an edited image obtained by editing the delivered image, from the user, retrieves available printing devices for printing the object image specified by the printing instruction, out of the multiple printing devices having the statues under management by the status management module; a display output module that outputs a display of the retrieved available printing devices in a selectable manner to allow for selection by the user; and a printing information output module that, in response to the user's selection of a selected printing device on the display of the retrieved available printing devices, outputs required printing information to the selected printing device to print the object image specified by the printing instruction with the selected printing device.

In response to the user's printing instruction to print an object image, which is either a delivered image or an edited image obtained by editing the delivered image, the first image delivery device of the invention retrieves the available printing devices for printing the object image specified by the printing instruction, out of the multiple printing devices. The second image printing system then outputs a display of the retrieved available printing devices in a selectable manner to allow for selection by the user. In response to the user's selection of a selected printing device on the display of the available printing devices, required printing information is output to the selected printing device to print the object image specified by the printing instruction with the selected printing device. This arrangement enables the user to select a desired printing device for printing the delivered image or the edited image as the object image.

In one preferable embodiment of the first image delivery device of the invention, the display output module outputs a display of statuses of the retrieved available printing devices. In this case, further, the display output module receives the user's request for displaying status of a specified printing device and outputs a display of the status of the specified printing device. This enables the display of the status of a printing device to be output, according to the user's requirement.

In one preferable embodiment of the first image delivery device of the invention, the status management module manages at least one of settings of ink type, paper type, and paper size in the multiple printing devices as part of the statuses of the multiple printing devices. This enables settings of ink type, paper type, or paper size in the multiple printing devices to be displayed to the user, as part of the statuses of the printing devices.

In another preferable embodiment of the first image delivery device of the invention, the status management module manages printing states of the multiple printing devices as part of the statuses of the multiple printing devices. This enables the printing states of the printing devices to be displayed to the user, as part of the statuses of the printing devices. Here the 'printing state' includes the volume of queuing prints (queuing jobs) to be printed by each of the multiple printing devices.

In still another preferable embodiment of the first image delivery device of the invention, the status management module manages the locations of the multiple printing devices as part of the statuses of the multiple printing devices. This enables the locations of the printing devices to be displayed to the user, as part of the statuses of the printing devices.

A program for an image delivery device of the present invention causes a computer to function as the first image delivery device with any of the arrangements discussed above. Namely, the basic effect of the first program of the invention is to cause a computer to function as the image delivery device that delivers an image selected by a user via a communication network to the user, the image delivery device including: an image storage module that stores multiple images; an image delivery module that delivers a selected image by the user out of the stored multiple images to the user; a status management module that manages statuses of multiple printing devices; a retrieval module that, in response to a printing instruction of an object image, which is either the delivered image or an edited image obtained by editing the delivered image, from the user, retrieves available printing devices for printing the object image specified by the printing instruction, out of the multiple printing devices having the statues under management by the status management module; a display output module that outputs a display of the retrieved available printing devices in a selectable manner to allow for selection by the user; and a printing information output module that, in response to the user's selection of a selected printing device on the display of the retrieved available printing devices, outputs required printing information to the selected printing device to print the object image specified by the printing instruction with the selected printing device.

The program for the image delivery device of the invention causes the computer to function as the first image delivery device of the invention having any of the arrangements discussed above. The first program for the image delivery device of the invention accordingly exerts the same effects as those of the first image delivery device of the invention, for example, the effect of enabling the user to select a desired printing device for printing a delivered image or an edited image obtained by editing the delivered image and the effect of displaying the status of a specified printing device.

A third image printing system of the present invention prints an image selected by a user via a communication network, the third image printing system including: an image storage module that stores multiple images; an image delivery module that delivers a selected image by the user out of the stored multiple images to the user; an information image input module that inputs editing information with regard to the user's settings for editing the delivered image, as well as a captured image obtained by capturing the selected image edited by the user as a check image; a printing image preparation module that edits the selected image with the input editing information to prepare a printing image; a check image output module that outputs the input check image to be comparable with the prepared printing image; and a printing module that prints an identical image to the prepared printing image.

The third image printing system of the invention inputs editing information with regard to the user's settings for editing the image delivered in response to the user's selection, as well as a captured image obtained by capturing the image edited by the user as a check image. The third image printing system outputs the input check image and a printing image prepared by editing the selected image with the input editing information in a comparable manner. The user can thus check the results of editing by reference to the check image. This arrangement enables the image selected and edited by the user to be printed with high reliability.

In one preferable embodiment of the third image printing system of the invention, the check image output module outputs the check image and a resized printing image, which is obtained by resizing the prepared printing image to an identical size with that of the check image, as either a display on one screen page or a printout on one sheet of printing paper.

Here, the printing image and the check image are displayed in an identical size. Such display facilitates determination of their consistency at a glance.

In one preferable embodiment of the third image printing system of the invention, the check image output module outputs the check image as either a display or a printout to be comparable with a resulting print printed by the printing module. This arrangement enables the results of editing carried out by the client computer (the user) to be confirmed, based on the comparison between the check image and the printing image.

In one preferable application of the third image printing system of the invention, the image storage module, the image delivery module, and the information image input module are incorporated in an image delivery server, and the printing image preparation module, the check image output module, and the printing module are incorporated in a printing server, which is communicable with the image delivery server. This structure allows the image delivery server and the printing server to be located at different positions. There may be a single or multiple printing servers.

In one preferable structure of the third image printing system of the invention having the image delivery server and the printing server, the image delivery server has an image information output module that outputs the selected image, the editing information, and the check image to the printing server, the printing image preparation module edits the selected image input from the image information output module with the input editing information to prepare a printing image, and the printing module prints the printing image prepared by the printing image preparation module as the identical image. This arrangement enables the printing server to edit and print an image by inputting the selected image and the editing information received from the image delivery server.

In another preferable structure of the third image printing system of the invention having the image delivery server and the printing server, the image storage module stores the multiple images with ID information on the respective multiple images, the image delivery server has an ID editing information output module that outputs ID information on the selected image, the editing information, and the check image to the printing server, and the printing server has a printing image storage module that stores multiple images with ID information on the respective multiple images, which are identical to the multiple images with the ID information on the respective multiple images stored in the image storage module. The printing image preparation module selects a corresponding image from the printing image storage module, based on the ID information of the selected image output from the ID editing information output module, and edits the selected corresponding image with the editing information output from the ID editing information output module to prepare a printing image, and the printing module prints the printing image prepared by the printing image preparation module as the identical image. The image delivery server sends only the ID information of the selected image, the editing information, and the check image to the printing server to print the selected image. This arrangement does not require transmission of the selected image itself.

In one preferable embodiment of the third image printing system of the invention, the check image output module outputs screen information to the user to display the check image and a resized printing image, which is obtained by resizing the prepared printing image to an identical size with that of the check image, on one screen page. This arrangement ensures the display of the printing image and the check image in an identical size. Such display facilitates determination of their consistency. In one preferable application of this embodiment, the third image printing system further includes a printing instruction input module that inputs a printing instruction from the user, in answer to the output of the screen information by the check image output module. The printing module prints the printing image, in response to input of the printing instruction by the printing instruction input module. This enables printing to be executed on condition of the consistency.

In one preferable application of the third image printing system of the invention, the image storage module, the image delivery module, the information image input module, and the check image output module are incorporated in an image delivery server, and the printing image preparation module and the printing module are incorporated in a printing server, which is communicable with the image delivery server. This structure allows the image delivery server and the printing server to be located at different positions. There may be a single or multiple printing servers.

In one preferable structure of the third image printing system of the invention having the image delivery server and the printing server, the check image output module outputs screen information to the user to display the check image and a resized printing image, which is obtained by resizing the prepared printing image to an identical size with that of the check image, to the printing server. This arrangement ensures the determination of consistency of the check image and the printing image in an identical size, prior to printing the selected image by the image printing device.

In another preferable structure of the third image printing system of the invention having the image delivery server and the printing server, the image printing system further includes a printing instruction input module that inputs a printing instruction from the printing server, in answer to the output of the screen information by the check image output module. The printing module prints the printing image, in response to input of the printing instruction by the printing instruction input module. This enables printing to be executed on condition of determination of the consistency by the printing server. In one modified structure of the third image printing system having the printing instruction input module mentioned above, the image storage module stores the multiple images with ID information on the respective multiple images, the image delivery server has an ID editing information output module that, in response to input of the printing instruction by the printing instruction input module, outputs ID information on the selected image and the editing information, to the printing server, the printing server has a printing image storage module that stores multiple images with ID information on the respective multiple images, which are identical to the multiple images with the ID information on the respective multiple images stored in the image storage module, the printing image preparation module selects a corresponding image from the printing image storage module, based on the ID information of the selected image output from the ID editing information output module, and edits the selected corresponding image with the editing information output from the ID editing information output module to prepare a printing image. In response to input of a printing instruction, the image delivery server in this modified structure sends only the ID information of the selected image, the editing information, and the check image to the printing server to print the selected image. This arrangement does not require transmission of the selected image itself.

A fourth image printing system of the present invention prints an image selected by a user via a communication network, the fourth image printing system including: an image storage module that stores multiple images; an image delivery module that delivers a selected image by the user out of the stored multiple images to the user; an information image input module that inputs editing information with regard to the user's settings for editing the delivered image, as well as a captured image obtained by capturing the selected image edited by the user as a check image; a printing image preparation module that edits the selected image with the input editing information to prepare a printing image; a consistency determination module that determines consistency of the prepared printing image with the input check image; and a printing module that prints an identical image to the printing image.

The fourth image printing system of the invention inputs editing information with regard to the user's settings for editing the image delivered in response to the user's selection, as well as a captured image obtained by capturing the image edited by the user as a check image. The fourth image printing system determines consistency of a prepared printing image, which is obtained by editing the selected image, with the input check image. The user can thus check the results of editing by reference to the check image. This arrangement enables the image selected and edited by the user to be printed with high reliability.

In one preferable embodiment of the fourth image printing system of the invention, the consistency determination module determines the consistency, based on the check image and a resized printing image, which is obtained by resizing the prepared printing image to an identical size with that of the check image. This arrangement ensures easy and accurate determination of consistency. In the fourth image printing system of this embodiment, the consistency determination module may cause the resized printing image and the check image to be subjected to a preset series of image processing and determine the consistency based on results of the image processing. This arrangement ensures accurate determination of consistency.

In one preferable application of the fourth image printing system of the invention, the image storage module, the image delivery module, and the information image input module are incorporated in an image delivery server, whereas the printing image preparation module, the consistency determination module, and the printing module are incorporated in a printing server, which is communicable with the image delivery server. This structure allows the image delivery server and the printing server to be located at different positions. The printing server takes charge of the determination of consistency. This ensures smooth delivery of images from the image delivery server. There may be a single or multiple printing servers.

In one preferable structure of the fourth image printing system of the invention having the image delivery server and the printing server, the image delivery server has an image information output module that outputs the selected image, the editing information, and the check image to the printing server. The printing image preparation module edits the selected image input from the image information output module with the input editing information to prepare a printing image. The printing module prints the printing image prepared by the printing image preparation module as the identical image. In this structure, the printing server inputs the selected image and the editing information from the image delivery server, edits the input selected image, and prints the edited image.

In another preferable structure of the fourth image printing system of the invention having the image delivery server and the printing server, the image storage module stores the multiple images with ID information on the respective multiple images. The image delivery server has an ID editing information output module that outputs ID information on the selected image, the editing information, and the check image to the printing server. The printing server has a printing image storage module that stores multiple images with ID information on the respective multiple images, which are identical to the multiple images with the ID information on the respective multiple images stored in the image storage module. The printing image preparation module selects a corresponding image from the printing image storage module, based on the ID information of the selected image output from the ID editing information output module, and edits the selected corresponding image with the editing information output from the ID editing information output module to prepare a printing image. The printing module prints the printing image prepared by the printing image preparation module as the identical image. The image delivery server sends only the ID information of the selected image, the editing information, and the check image to the printing server. This arrangement does not require transmission of the selected image itself.

In still another preferable structure of the fourth image printing system of the invention having the image delivery server and the printing server, the printing server has an alarm output module that outputs an alarm in the case of determination of inconsistency by the consistency determination module. An alarm is given when the printing image is inconsistent with the check image.

In one preferable embodiment, the fourth image printing system further includes an alarm output module that outputs an alarm to the user via the communication network in the case of determination of inconsistency by the consistency determination module. An alarm is given when the printing image is inconsistent with the check image.

In one preferable application of the fourth image printing system having the alarm output module, the image storage module, the image delivery module, the information image input module, the printing image preparation module, the consistency determination module, and the alarm output module are incorporated in an image delivery server, and the printing module and an identical image preparation module that prepares the identical image to the printing image are incorporated in a printing server, which is communicable with the image delivery server. This structure allows the image delivery server and the printing server to be located at different positions. There may be a single or multiple printing servers.

In one preferable structure of the fourth image printing system having the alarm output module, the image delivery server includes an image information output module that outputs the selected image and the editing information to the printing server, in the case of determination of consistency by the consistency determination module. The identical image preparation module edits the selected image output from the image information output module with the input editing information to prepare the identical image to the printing image. In this structure, the printing server inputs the selected image and the editing information from the image delivery server, edits the input selected image, and prints the edited image, on condition of determination of the consistency.

In another preferable structure of the fourth image printing system having the alarm output module, the image storage module stores the multiple images with ID information on the respective multiple images, the image delivery server has an ID editing information output module that, in the case of determination of consistency by the consistency determination module, outputs ID information on the selected image and the editing information, to the printing server, and the printing server has a printing image storage module that stores multiple images with ID information on the respective multiple images, which are identical to the multiple images with the ID information on the respective multiple images stored in the image storage module. And the identical image preparation module selects a corresponding image from the printing image storage module, based on the ID information of the selected image output from the ID editing information output module, and edits the selected corresponding image with the editing information output from the ID editing information output module to prepare the identical image to the printing image. The image delivery server sends only the ID information of the selected image, the editing information, and the check image to the printing server, in order to print the selected image on condition of determination of consistency. This arrangement does not require transmission of the selected image itself.

A second image delivery device of the present invention delivers an image selected by a user via a communication network, the second image delivery device including: an image storage module that stores multiple images; an image delivery module that delivers a selected image by the user out of the stored multiple images to the user; an information image input module that inputs editing information with regard to the user's settings for editing the delivered image, as well as a captured image obtained by capturing the selected image edited by the user as a check image; and a printing information output module that outputs printing information, which includes the input editing information, information on the selected image, and the check image, to an image printing device.

The second image delivery device of the invention inputs editing information with regard to the user's settings for editing the image delivered in response to the user's selection, as well as a captured image obtained by capturing the selected image edited by the user as a check image. The second image delivery device outputs printing information, which includes the input editing information, information on the selected image, and the check image, to an image printing device. The image printing devices is thus allowed to check the results of editing by the user by reference to the check image. This arrangement enables the image selected and edited by the user to be printed with high reliability.

The third image delivery device of the present invention delivers an image selected by a user via a communication network, the third image delivery device including: an image storage module that stores multiple images; an image delivery module that delivers a selected image by the user out of the stored multiple images to the user; an information image input module that inputs editing information with regard to the user's settings for editing the delivered image, as well as a captured image obtained by capturing the selected image edited by the user as a check image; a printing image preparation module that edits the selected image with the input editing information to prepare a printing image; and a check window information output module that outputs screen information to the user to display the check image and a resized printing image, which is obtained by resizing the prepared printing image to an identical size with that of the check image, on one screen page.

The third image delivery device of the invention inputs editing information with regard to the user's settings for editing the image delivered in response to the user's selection, as well as a captured image obtained by capturing the selected image edited by the user as a check image. The third image delivery device edits the selected image with the input editing information to prepare a printing image and outputs screen information to the user to display the check image and a resized printing image, which is obtained by resizing the printing image to an identical size with that of the check image, on one screen page. The user can thus confirm the consistency of an image to be printed with an image edited by the user. This arrangement enables the image selected and edited by the user to be printed with high reliability.

In one preferable embodiment, the third image delivery device further includes: a printing instruction input module that inputs a printing instruction from the user, in answer to the output of the screen information by the check window information output module; and a printing information output module that outputs printing information, which includes the input editing information and information on the selected image, to an image printing device, in response to input of the printing instruction. In this arrangement, the printing information is output and the selected image is printed, on condition that the user confirms the consistency of an image to be printed with an image edited by the user.

A fourth image delivery device of the present invention delivers an image selected by a user via a communication network, the fourth image delivery device including: an image storage module that stores multiple images; an image delivery module that delivers a selected image by the user out of the stored multiple images to the user; an information image input module that inputs editing information with regard to the user's settings for editing the delivered image, as well as a captured image obtained by capturing the selected image edited by the user as a check image; a printing image preparation module that edits the selected image with the input editing information to prepare a printing image; a consistency determination module that determines consistency of the prepared printing image with the input check image; and a printing information output module that outputs printing information, which includes the input editing information and information on the selected image, to an image printing device, in the case of determination of consistency.

The fourth image delivery device of the invention inputs editing information with regard to the user's settings for editing the image delivered in response to the user's selection, as well as a captured image obtained by capturing the selected image edited by the user as a check image. The fourth image delivery devices edits the selected image with the input editing information to prepare a printing image and determines consistency of the prepared printing image with the input check image to confirm the results of editing by the user. In the case of determination of consistency, printing information, which includes the editing information and information on the selected image, is output to an image printing device. This arrangement enables the image selected and edited by the user to be printed with high reliability.

In one preferable embodiment of the fourth image delivery device of the invention, the consistency determination module determines the consistency, based on the check image and a resized printing image, which is obtained by resizing the prepared printing image to an identical size with that of the check image. Such arrangement facilitates determination of their consistency of a prepared printing image with a check image. In one preferable application of this embodiment, the consistency determination module may cause the resized printing image and the check image to be subjected to a preset series of image processing and determines the consistency, based on results of the image processing. This ensures more accurate determination of the consistency.

In another preferable embodiment of the invention, the fourth image delivery device further includes an alarm output module that outputs an alarm to the user via the communication network in the case of determination of inconsistency by the consistency determination module. An alarm is given when the printing image is inconsistent with the check image.

The techniques of the invention are also applicable to a program which causes a computer to function as any of the second through the fourth image delivery devices of the invention having any of the above arrangements. The program for the image delivery device accordingly exerts the same effects as those of the second through the fourth image delivery devices of the invention, for example, the effect of enabling the image printing device to check the results of editing by the user by reference to the input check image, the effect of enabling the user to check the consistency of the image to be printed with the image edited by the user, the effect of confirming the results of editing by the user, and the effects of enabling the image selected and edited by the user to be printed with high reliability.

A first image printing device of the present invention prints an image delivered from and edited by an image delivery device, the first image printing device including: an information image input module that inputs image-relating information and editing information on the image from the image delivery device, as well as a captured image obtained by capturing the delivered and edited image as a check image; a printing image preparation module that edits the image with the input image-relating information and the input editing information to prepare a printing image; a check image output module that outputs the input check image to be comparable with the prepared printing image; and a printing module that prints the prepared printing image.

The first image printing device of the invention inputs image-relating information and editing information on the image from the image delivery device, as well as a captured image obtained by capturing the delivered and edited image as a check image. The first image printing device edits the image with the input image-relating information and the input editing information to prepare a printing image, and outputs the input check image to be comparable with the prepared printing image. The image printing device is thus allowed to check the results of editing by the user by reference to the check image. This arrangement enables the image selected and edited by the user to be printed with high reliability.

In one preferable embodiment of the first image printing device of the invention, the check image output module outputs the check image and a resized printing image, which is obtained by resizing the prepared printing image to an identical size with that of the check image, as either a display on one screen page or a printout on one sheet of printing paper. The image printing device is thus allowed to check the consistency of a printing image with a check image at a glance.

In another preferable embodiment of the first image printing device of the invention, the check image output module outputs the check image as either a display or a printout to be comparable with a resulting print printed by the printing module. In this arrangement, the image printing device is allowed more adequately to check the results of editing by the user by reference to the check image.

A second image printing device of the present invention prints an image delivered from and edited by an image delivery device, the second image printing device including: an information image input module that inputs image-relating information and editing information on the image from the image delivery device, as well as a captured image obtained by capturing the delivered and edited image as a check image; a printing image preparation module that edits the image with the input image-relating information and the input editing information to prepare a printing image; a consistency determination module that determines consistency of the prepared printing image with the input check image; and a printing module that prints the prepared printing image.

The second image printing device of the invention inputs image-relating information and editing information on the image from the image delivery device, as well as a captured image obtained by capturing the delivered and edited image as a check image. The second image printing device edits the image with the input image-relating information and the input editing information to prepare a printing image, and determines the consistency of the input check image with the prepared printing image. The image printing device is thus allowed to check the results of editing by the user by reference to the check image. This arrangement enables the image selected and edited by the user to be printed with high reliability.

In one preferable embodiment of the second image printing device of the invention, the consistency determination module determines the consistency, based on the check image and a resized printing image, which is obtained by resizing the prepared printing image to an identical size with that of the check image. This arrangement facilitates the determination of the consistency. In one preferable application of this embodiment, the consistency determination module causes the resized printing image and the check image to be subjected to a preset series of image processing and determines the consistency, based on results of the image processing. Thus, the consistency is determined more adequately.

In another preferable embodiment, the second image printing device of the further includes an alarm output module that outputs an alarm in the case of determination of inconsistency by the consistency determination module. An alarm is given when the printing image is inconsistent with the check image.

In one preferable embodiment of the first or the second image printing device of the invention, the information image input module inputs image data as the image-relating information from the image delivery device via a communication line. This enables a printing image to be prepared by inputting the image data and the editing information from the image delivery device.

In another preferable embodiment, the first or the second image printing device of the invention further includes an image storage module that stores each image delivered from the image delivery device with ID information on the delivered image. In this embodiment, the information image input module inputs ID information on the image as the image-relating information from the image delivery device via a communication line, and the printing image preparation module selects a corresponding image from the image storage module, based on the ID information on the image input by the information image input module and edits the selected corresponding image with the editing information input by the information image input module to prepare the printing image. The image printing device only inputs ID information and the editing information. This arrangement does not require transmission of the selected image itself.

The techniques of the invention are also applicable to a program which causes a computer to function as either the first image printing device or the second image printing device of the invention having any of the arrangements discussed above. The program for the image printing device of the invention accordingly exerts the same effects as those of the first image printing device or the second image printing device of the invention, for example, the effect of checking the results of editing by the user by reference to a check image, the effect of confirming the results of editing by the user, and the effect of enabling the image selected and edited by the user to be printed with high reliability.

A first image printing method of the present invention prints an image selected by a user via a communication network, the first image printing method including the steps of: (a) delivering an image selected by the user to the user; (b) in response to a printing instruction of an object image, which is either the delivered image or an edited image obtained by editing the delivered image, from the user, retrieves available printing devices for printing the object image specified by the printing instruction, out of the multiple printing devices; (c) outputting a display of the retrieved available printing devices in a selectable manner to allow for selection by the user; and (d) in response to the user's selection of a selected printing device on the display of the retrieved available printing devices, outputting required printing information to the selected printing device to print the object image specified by the printing instruction with the selected printing device.

In response to the user's printing instruction to print an object image, which is either a delivered image or an edited image obtained by editing the delivered image, the first image printing method of the invention retrieves the available printing units for printing the object image specified by the printing instruction, out of the multiple printing units. The second image printing method then outputs a display of the retrieved available printing units in a selectable manner to allow for selection by the user. In response to the user's selection of a selected printing unit on the display of the available printing units, required printing information is output to the selected printing unit to print the object image specified by the printing instruction with the selected printing unit. This arrangement enables the user to select a desired printing unit for printing the delivered image or the edited image as the object image.

A second image printing method of the present invention prints an image selected by a user via a communication network, the image printing method including the steps of: (a) delivering an image selected by the user to the user; (b) inputting editing information with regard to the user's settings for editing the delivered image, as well as a captured image obtained by capturing the selected image edited by the user as a check image; (c) editing the selected image with the input editing information to prepare a printing image; (d) outputting the input check image to be comparable with the prepared printing image; and (e) printing the prepared printing image, after confirmation of the output check image.

The second image printing method of the invention inputs editing information with regard to the user's settings for editing the image delivered in response to the user's selection, as well as a captured image obtained by capturing the image edited by the user as a check image. The second image printing method outputs the input check image and a printing image prepared by editing the selected image with the input editing information in a comparable manner. The user can thus check the results of editing by reference to the check image. This arrangement enables the image selected and edited by the user to be printed with high reliability.

In one preferable embodiment of the second image printing method of the invention, the step (d) outputs the check image and a resized printing image, which is obtained by resizing the prepared printing image to an identical size with that of the check image, as either a display on one screen page or a printout on one sheet of printing paper. The method is thus allowed to check the consistency of a printing image with a check image at a glance.

In one preferable embodiment of the second image printing method of the invention, the step (d) outputs screen information to the user to display the check image and a resized printing image, which is obtained by resizing the prepared printing image to an identical size with that of the check image, on one screen page. The user can thus confirm the consistency of an image to be printed with a check image in an identical size.

In another preferable embodiment of the second image printing method of the invention, the step (e) prints the printing image, in response to a printing instruction input from the user in answer to screen information output to the user. This enables printing to be executed on condition of determination of the consistency by the user.

A third image printing method of the present invention prints an image selected by a user via a communication network, the third image printing method including the steps of: (a) delivering an image selected by the user to the user; (b) inputting editing information with regard to the user's settings for editing the delivered image, as well as a captured image obtained by capturing the selected image edited by the user as a check image; (c) editing the selected image with the input editing information to prepare a printing image; (d) determining consistency of the prepared printing image with the input check image; and (e) printing the prepared printing image, based on a result of the determination of consistency.

The third image printing method of the invention inputs editing information with regard to the user's settings for editing the image delivered in response to the user's selection, as well as a captured image obtained by capturing the image edited by the user as a check image. The fourth image printing system determines consistency of a prepared printing image, which is obtained by editing the selected image, with the input check image. The user can thus check the results of editing by reference to the check image. This arrangement enables the image selected and edited by the user to be printed with high reliability.

In one preferable embodiment of the third image printing method of the invention, the step (d) determines the consistency, based on the check image and a resized printing image, which is obtained by resizing the prepared printing image to an identical size with that of the check image. This ensures easy and accurate determination of consistency. In one preferable application of this embodiment, the step (d) causes the resized printing image and the check image to be subjected to a preset series of image processing and determines the consistency, based on results of the image processing. This ensures more adequate determination of consistency.

In another preferable embodiment, the third image printing method further includes the step of (d1) outputting an alarm in the case of determination of inconsistency by the step (d). In one preferable application of this embodiment, the step (d1) outputs an alarm to the user via the communication network. An alarm is given when the printing image is inconsistent with the check image.

BRIEF DESCRIPTION OF THE DRAWINGS

FIG. 6 shows an example of a window for selection and settings of a printer displayed on a screen of the computer 22 of the user in response to activation of an image editor 24;

DESCRIPTION OF THE PREFERRED EMBODIMENT

Figure 1:
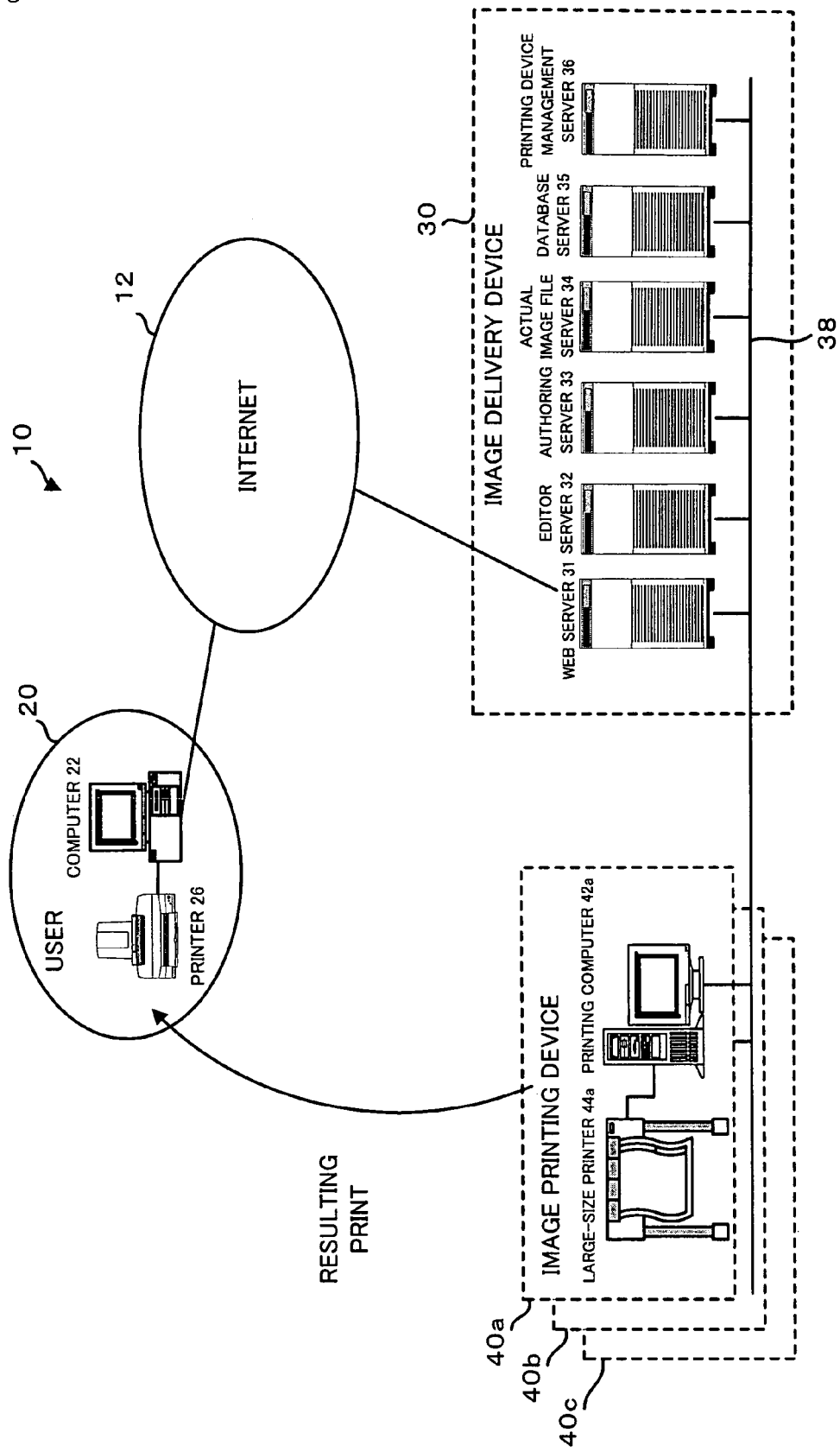
FIG. 1 schematically illustrates the configuration of an image printing system 20 in one embodiment of the invention.
Figure 2:
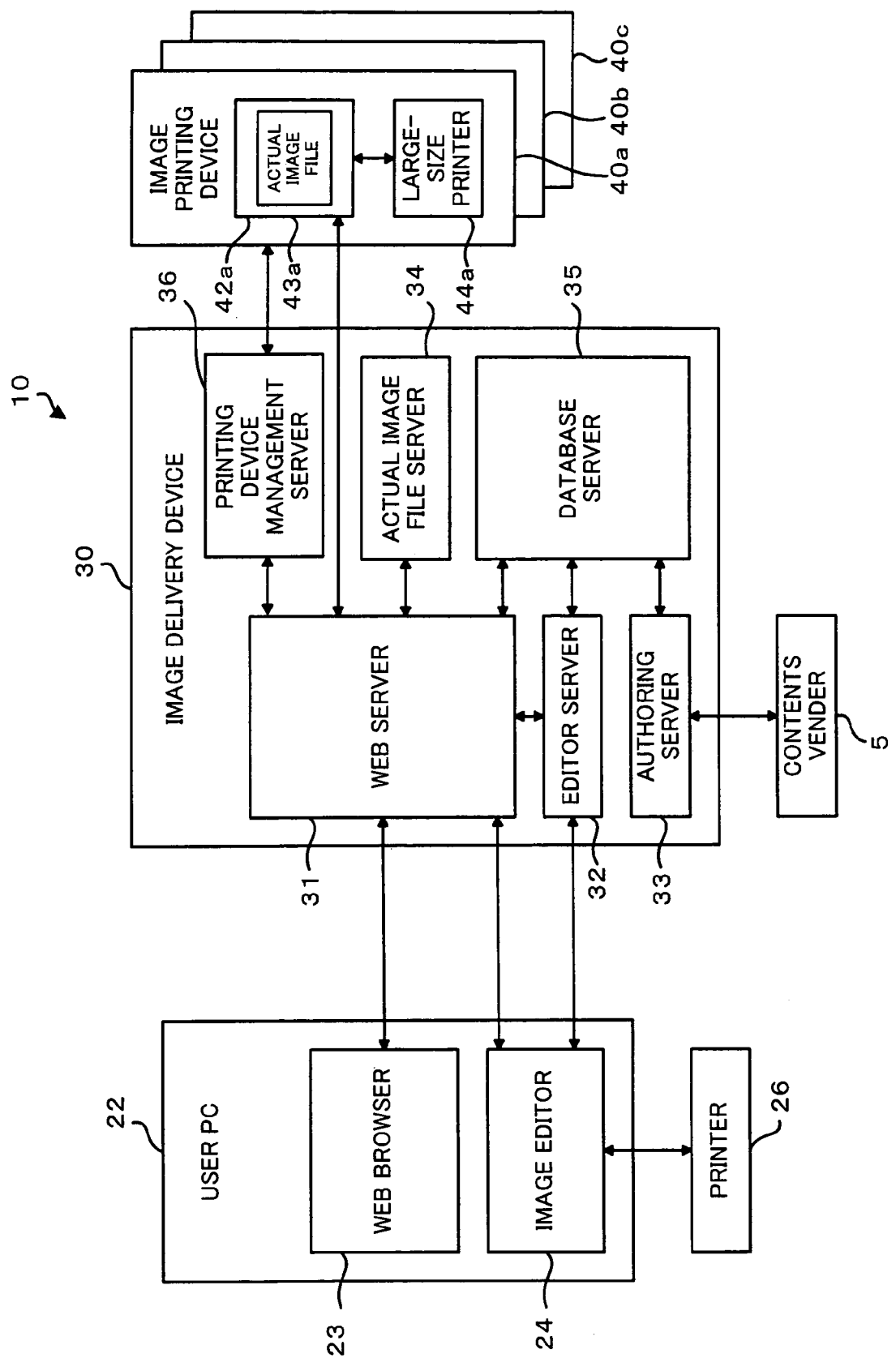
FIG. 2 is a block diagram mainly showing data transmission between a computer 22 of a user 20 and an image delivery device 30 included in the image printing system 20.

Some modes of carrying out the invention are discussed below as preferred embodiments. FIG. 1 schematically illustrates the configuration of an image printing system 10 in one embodiment of the invention. FIG. 2 is a block diagram mainly showing data transmission between a computer 22 of a user 20 and an image delivery device 30 included in the image printing system 10. As shown in FIGS. 1 and 2, the image printing system 10 of the embodiment includes the image delivery device 30, the computer 22 of the user 20 connecting with the image delivery device 30 via the Internet 12, and multiple image printing devices 40a through 40c that are installed in printing centers at multiple different locations and are connected with the image delivery device 30 via a LAN 38. The image delivery device 30 is constructed by mutually connecting a Web server 31, an editor server 32, an authoring server 33, an actual image file server 34, a database server 35, and a printing device management server 36 via the LAN 38.

As shown in FIG. 2, the computer 22 of the user 20 stores two application software programs, that is, a known Web browser 23 and an image editor 24 downloaded from the image delivery device 30 to carry out delivery, editing, and printing of images under management of the image delivery device 30. The computer 22 is also connected with a printer 26 that is capable of photographic printing up to a size A3 under management of the image editor 24.

Like the Web server 31, the editor server 32 of the image delivery device 30 is located at a front end of an Internet site to process requests from the image editor 24, acquire information required for the image editor 24 from the database server 35, and transfer the acquired information to the image editor 24. The editor server 32 cooperates with the Web server 31 to generate layout information and confirm settlement.

The authoring server 33 of the image delivery device 30 processes each image fetched from a contents vender 5, which provides various images, to a thumbnail image for image selection, a preview image for preview, and a layout image for layout, as well as to an allowable resized actual image of a size among A sizes like A0, A1, and A2 and B sizes like B0, B1, and B2. The authoring server 33 encrypts the layout image and the actual image in a format decodable by only the image editor 24 and adds control data including the name of the shop, the price, the description, and the use restriction to the processed image. The authoring server 33 registers the thumbnail image, the preview image, and the layout image into the Web server 31, the resized actual image into the actual image file server 34, and diverse related data into the database server 35.

The printing device management server 36 of the image delivery device 30 is connected via the LAN 38 with printing computers 42a through 44a, which are respectively included in the multiple image printing devices 40a through 40c installed in the multiple printing centers at the multiple different locations. The printing device management server 36 inputs jurisdiction areas of the respective printing centers and statuses of large-size printers 44a through 44c, which connect with the respective printing computers 42a through 42c, for example, the settings of the ink type, the paper type, and the paper size in each of the large-size printers 44a through 44c and the volume of queuing prints (queuing jobs) in each of the large-size printers 44a through 44c, from the corresponding printing computers 42a through 42c. The printing device management server 36 outputs the input information to the Web server 31, in response to requests from the Web server 31.

The printing computers 42a through 42c included in the image printing devices 40a through 40c store images, which are identical to a large number of resized images stored in the actual image file server 34, with IDs allocated to the images into external storage units 43a through 43c, for example, hard disks. Each of the printing computers 42a through 42c retrieves an object image out of the storage based on an image ID and editing information sent from the Web server 31, edits the object image, and prints the edited object image with the corresponding one of the large-size printers 44a through 44c, which are connected with the printing computers 42a through 42c and are capable of color printing up to the size A0 or the size B0. As a matter of convenience, the illustration of FIGS. 1 and 2 includes three image printing devices 40a through 40c installed in three printing centers. The number of the printing centers is, however, not restricted to three. The large-size printers 44a through 44c are respectively connected to the printing computers 42a through 42c in the image printing devices 40a through 40c. Multiple printers may alternatively be connected to one printing computer. Each printing center delivers resulting prints by any of the image printing devices 40a through 40c to the user 20, based on delivery information of the user 20 sent from the Web server 31.

Figure 3:
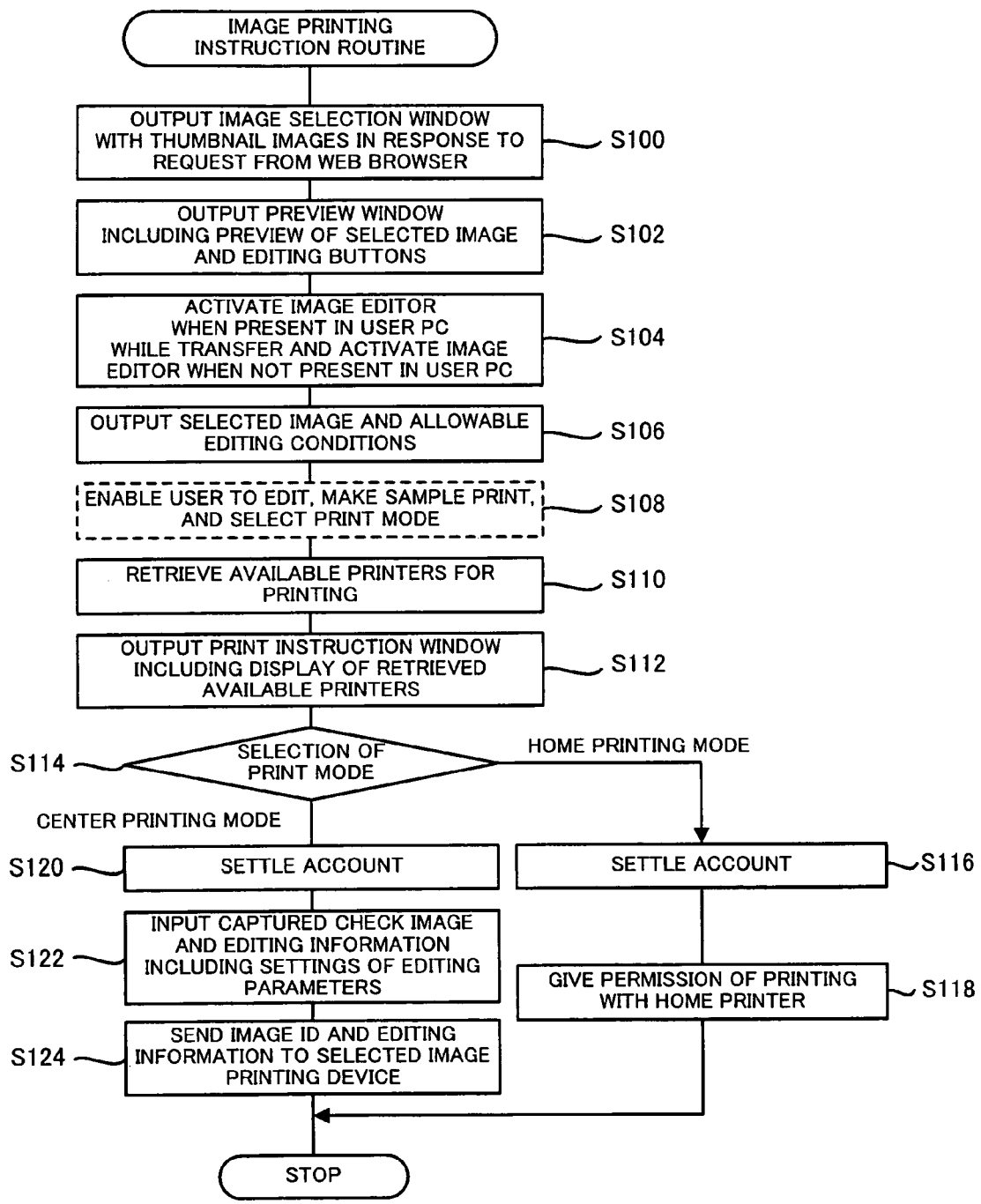
FIG. 3 is a flowchart showing an image printing instruction routine executed by a Web server 31.

The following describes series of operations executed by the image printing system 20 of the embodiment constructed as discussed above, especially a series of processing executed by the Web server 31 to print an image delivered to the user 20 or an image delivered to and edited by the user 20 with the printer 26 of the user 20 or with one of the image printing devices 40a through 40c installed in the printing centers. FIG. 3 is a flowchart showing an image printing instruction routine executed by the Web server 31. This image printing instruction routine starts in response to a request from the Web browser 23 in the computer 22 of the user 20 via the Internet 12.

Figure 4:
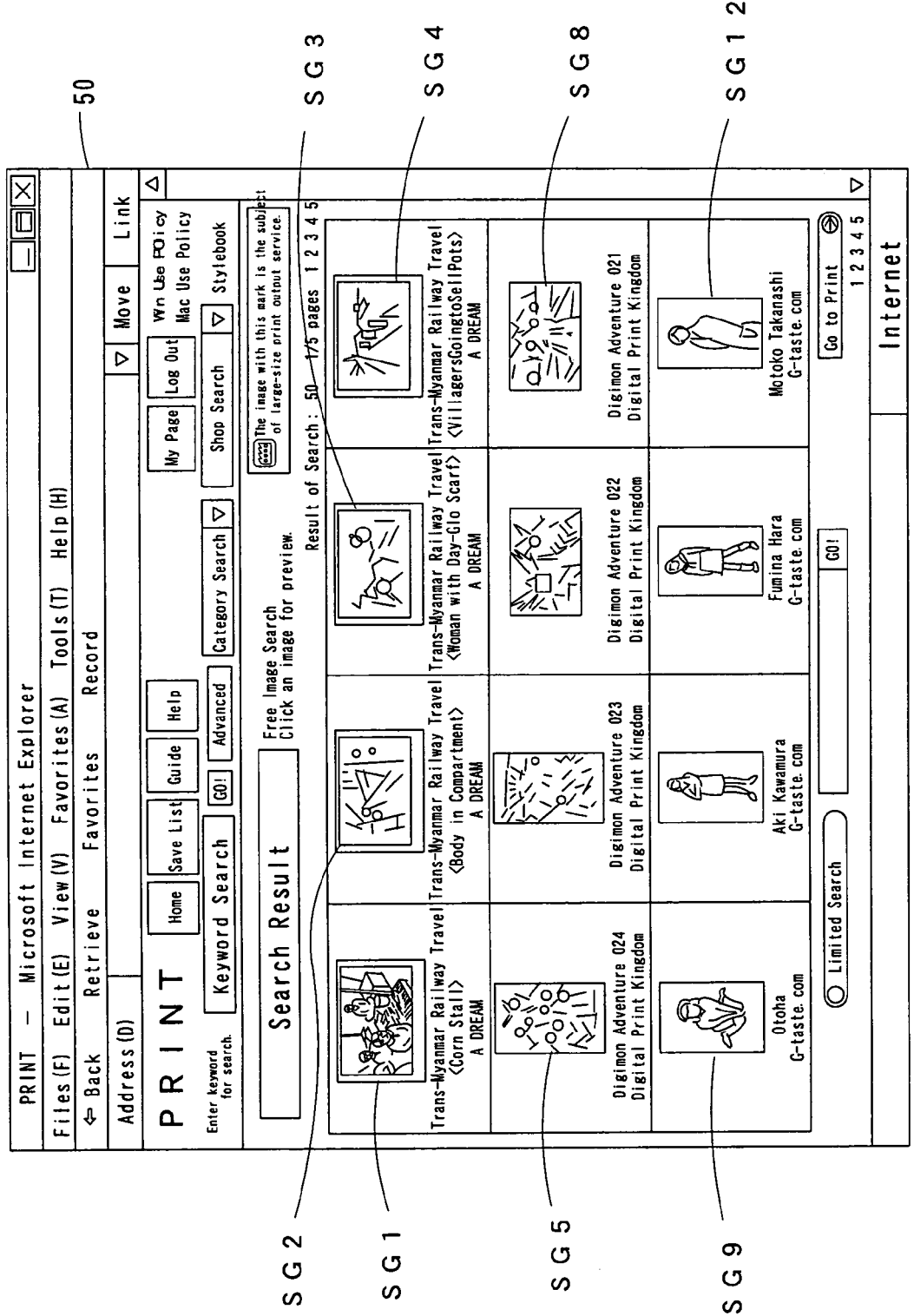
FIG. 4 shows an example of an image selection window 50.
Figure 5:
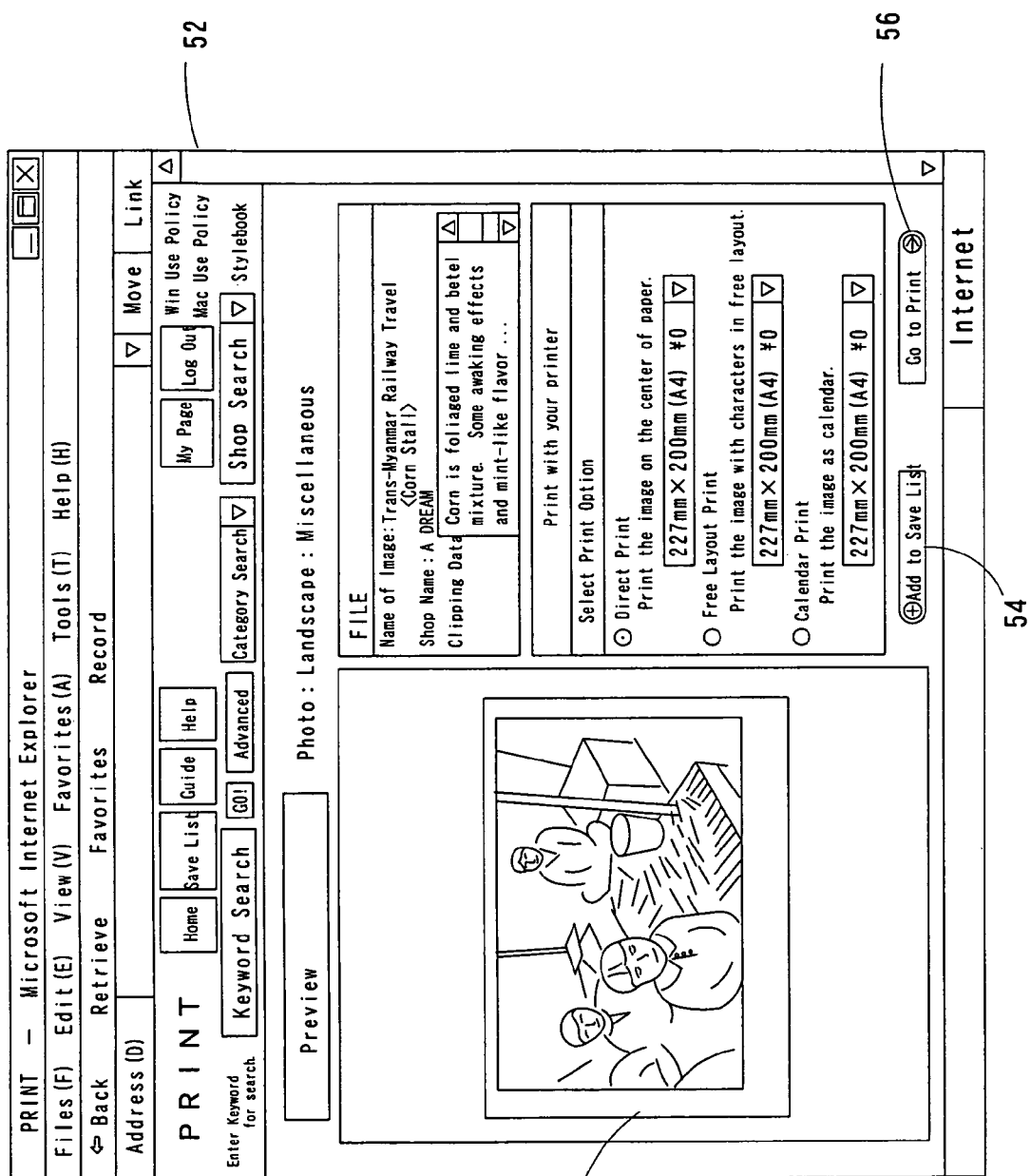
FIG. 5 shows an example of a preview window 52.

The image printing instruction routine first outputs an image selection window 50 with multiple thumbnail images to the Web browser 23, in response to a request from the user's Web browser 23 (step S100). One example of the image selection window 50 is shown in FIG. 4. In the illustrated example of FIG. 4, the image selection window 50 includes twelve thumbnail images SG1 through SG12 with their simple descriptions in a selectable manner on one screen page. When the user 20 selects a desired thumbnail image among the twelve thumbnail images SG1 through SG12 displayed on the image selection window 50 by, for example, mouse clicking, the routine outputs a preview window 52 including a preview image corresponding to the selected thumbnail image to the Web browser 23 (step S102). One example of the preview window 52 is shown in FIG. 5. In the illustrated example of FIG. 5, the preview window 52 includes display of a preview image PG corresponding to the selected thumbnail image, comment with regard to the selected image, selection of print application and printing paper size, an 'Add to Save List' button 54 and a 'Go to Print' button 56. When the user 20 clicks the 'Add to Save List' button 54 with the mouse, image information on the selected image is stored in a save list, which is a storage area provided on the database for each user.

In response to the user's selection of the 'Go to Print' button 56 on the preview window 52, the routine activates the image editor 24 in the computer 22 of the user 20 when present in the computer 22, while transferring the image editor 24 from the Web server 31 to the computer 22 and activating the image editor 24 when not present in the computer 22 (step S104). Simultaneously with activation of the image editor 24, the routine outputs a layout image corresponding to the selected thumbnail image and allowable editing conditions to the image editor 24 (step S106). The image editor 24 is transferred from the Web server 31 to the computer 22 and is activated in the computer 22, when the user 20 of the computer 22 selects a desired image and clicks the 'Go to Print' button 56 at this site in a first cycle of this routine. In second and subsequent cycles of this routine, the image editor 24 transferred in the first cycle is activated in the computer 22. Activation of the image editor 24 is implemented according to description of Active X control in response to selection of the 'Go to Print' button 56 on the preview window 52.

Figure 7:
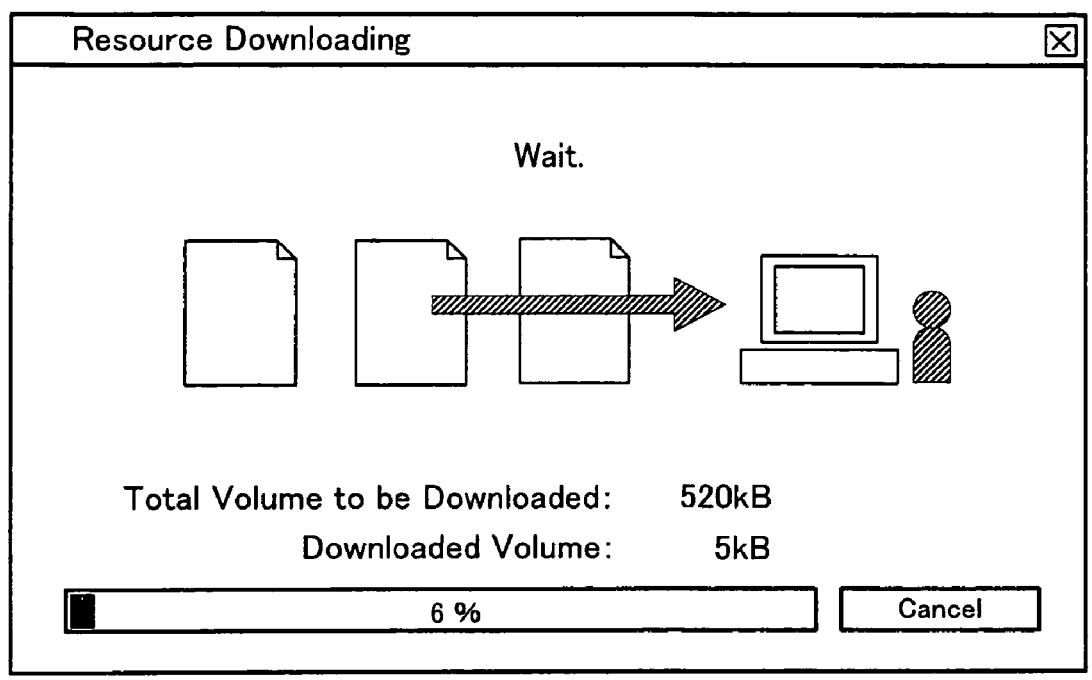
FIG. 7 shows an example of a window displayed on the computer 22 while downloading an image information (editing resource) including a layout image LG.

In the structure of this embodiment, activation of the image editor 24 is accompanied with selection and settings of a printer, download of an editing resource, and display of palette images. FIG. 6 shows one example of a window for selection and settings of a printer. FIG. 7 shows one example of a window for downloading an editing resource.

The allowable editing conditions are preset as an allowable editing range permitted by the copyright holder of the selected image and include, for example, an allowable range of contraction and expansion, permission for rotation, permission for combination, permission for overlap, permission for variation in aspect ratio, and permission for free layout. The image editor 24 downloads such allowable editing conditions as part of the editing resource, together with the layout image and other pieces of information in the form of on-off flags.

Figure 8:
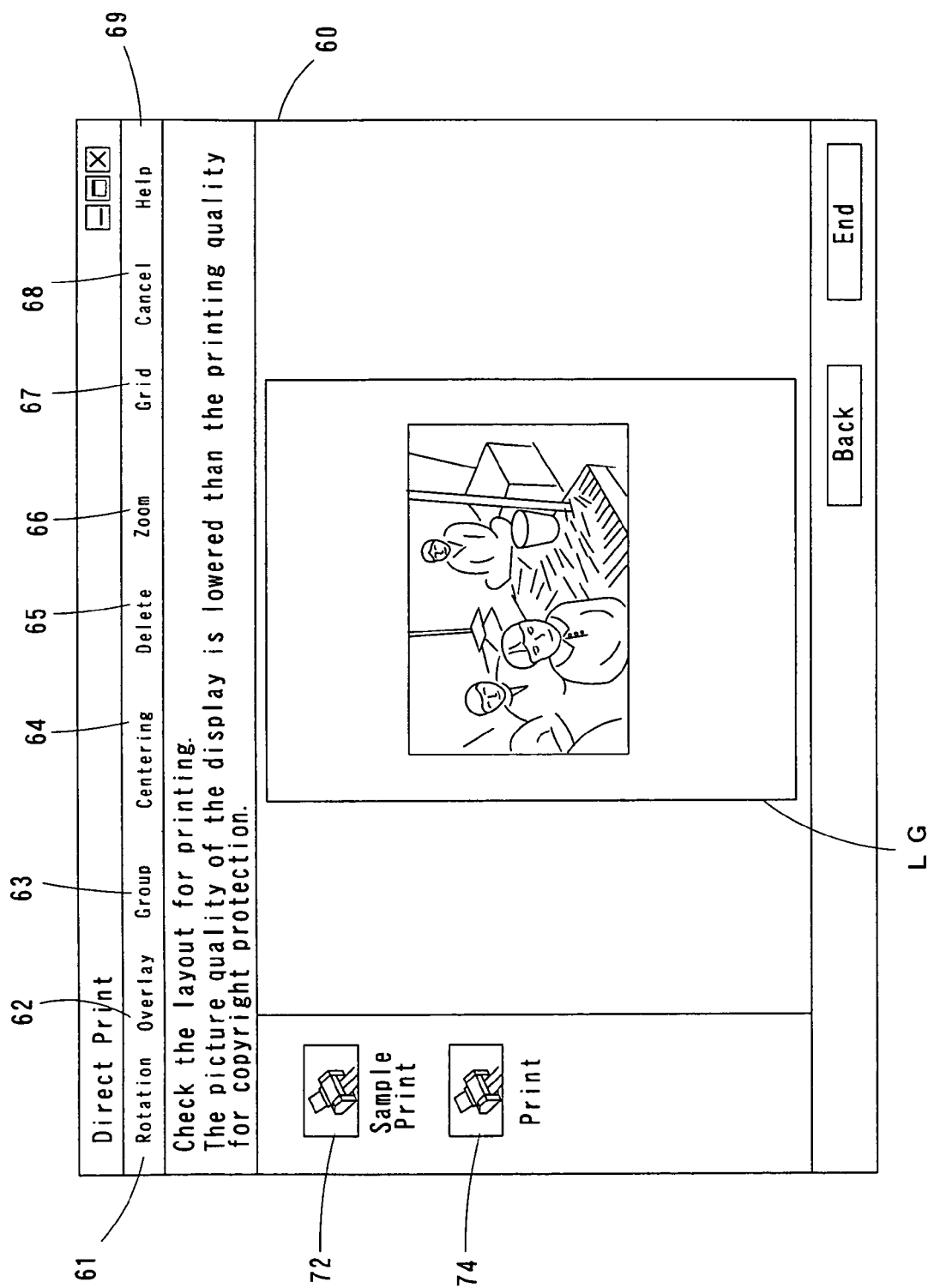
FIG. 8 shows an example of an editing print window 60.

When the image information (the editing resource) is downloaded, the image editor 24 in the computer 22 displays an editing print window 60 of FIG. 8, which includes a layout image LG corresponding to the selected thumbnail image, and enables the user 20 to edit the layout image LG corresponding to the selected image, to make a sample print of the edited image, and to select a print mode for printing the edited image between a home printing mode and a center printing mode (step S110). Editing of the layout image LG is allowed with regard to only specifications permitted in the allowable editing conditions. On the editing print window 60 shown in FIG. 8, only editing buttons corresponding to the specifications permitted in the allowable editing conditions are active among editing buttons 61 to 69. The user can thus clearly see which specifications have permission for editing. The user 20 is thus allowed to edit the layout image LG in the allowable editing range with the active editing buttons 61 to 69. The sample printing is carried out, in response to a click of a 'Sample Print' button 72 on the editing print window 60. A concrete procedure of the sample printing causes the editor server 32 to download an actual image of an input size from the actual image file server 34 and prints the actual image with overlay of a letter string 'Sample' at multiple places. The step of enabling the user 20 to edit, make a sample print, and select the print mode (step S108) is not executed by the Web server 31 or the editor server 32 but is carried out by the user 20. The block of this step is accordingly shown by the broken line in the flowchart of FIG. 3.

The editing print window 60 includes a 'Print' button 74, in addition to the editing buttons 61 through 67 for editing the layout image LG and the 'Sample Print' button 72. In response to a click of the 'Print' button 74, the edited image may be printed with the printer 26 of the user 20 or may be printed with one of the large-size printers 44*a* through 44*c* located in the printing centers 40*a* through 40*c* for delivery.

Figure 9:
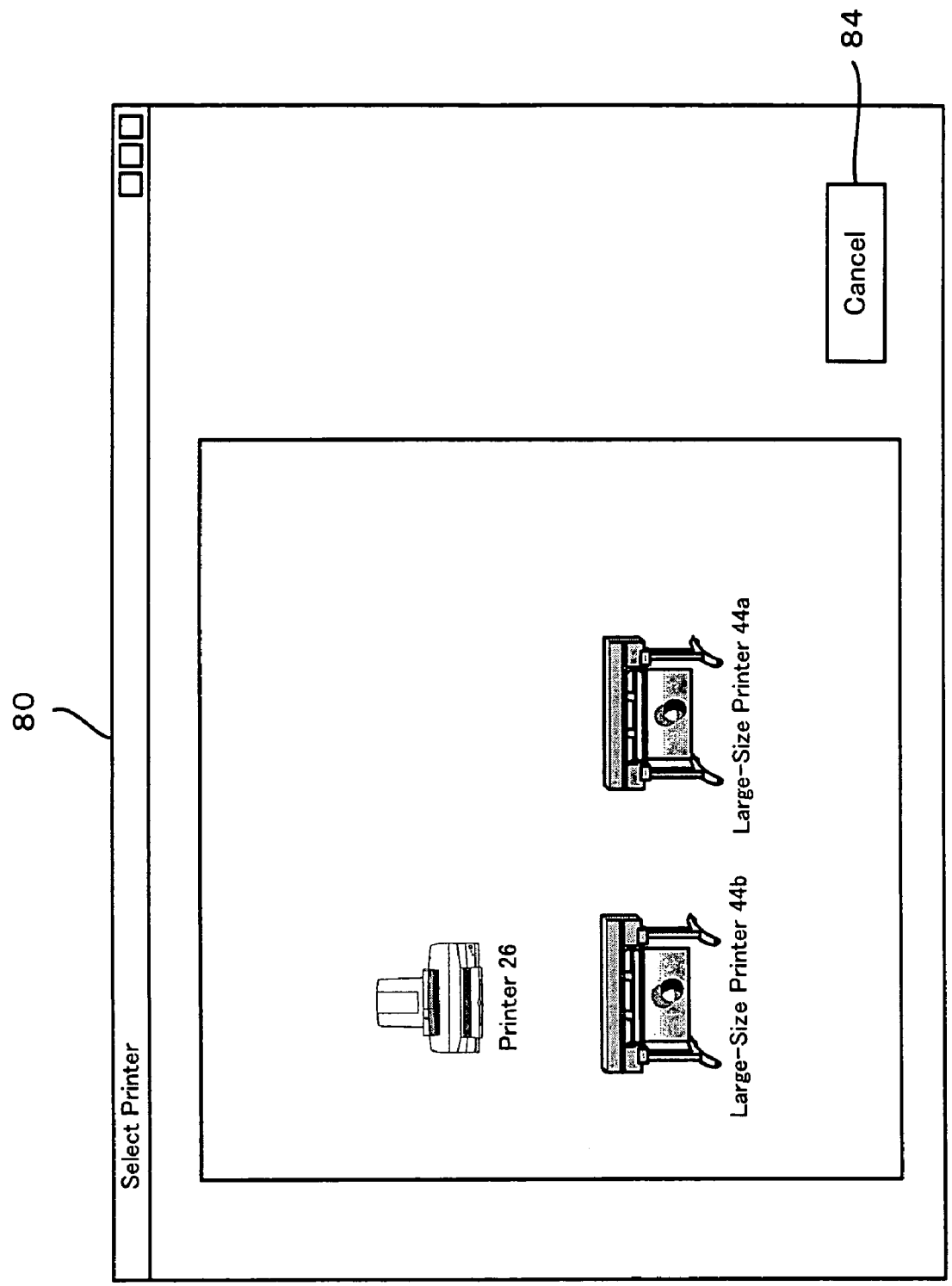
FIG. 9 shows an example of a print instruction window 80.

When the user 20 clicks the 'Print' button 74, the routine retrieves available printers for printing the selected image or the edited image, based on the settings of the ink type and the paper size suitable for printing the selected image or the edited image (step S110). The routine then outputs a print instruction window 80 of FIG. 9, which includes a list of the retrieved available printers with their current statuses, to the image editor 24 for display (step S112). The editor server 32 uses the printing device management server 36 to retrieve the available printers. The printing device management server 36 has the inputs of the jurisdiction areas of the respective printing centers and the settings of the ink type, the paper type, and the paper size and the volume of queuing prints (queuing jobs) in each of the large-size printers 44*a* through 44*c*. The editor server 32 outputs information for retrieval, which includes the ink type and the paper size suitable for printing the object image and the postal address of the user 20, to the printing device management server 36. The editor server 32 accordingly uses the printing device management server 36 to retrieve available printers in the printing centers that satisfy retrieval conditions specified by the information for retrieval and receives a result of the retrieval from the printing device management server 36. The print instruction window 80 of FIG. 9 shows the retrieved available printers in the form of printer icons. The printers as the objects of retrieval include the printers located in the respective printing centers, as well as the printer 26 of the user 20 as long as the retrieval conditions are fulfilled. In the print instruction window 80 of FIG. 9, the printer 26 of the user 20 is included as one of the available printers that satisfy the retrieval conditions.

Figure 10:
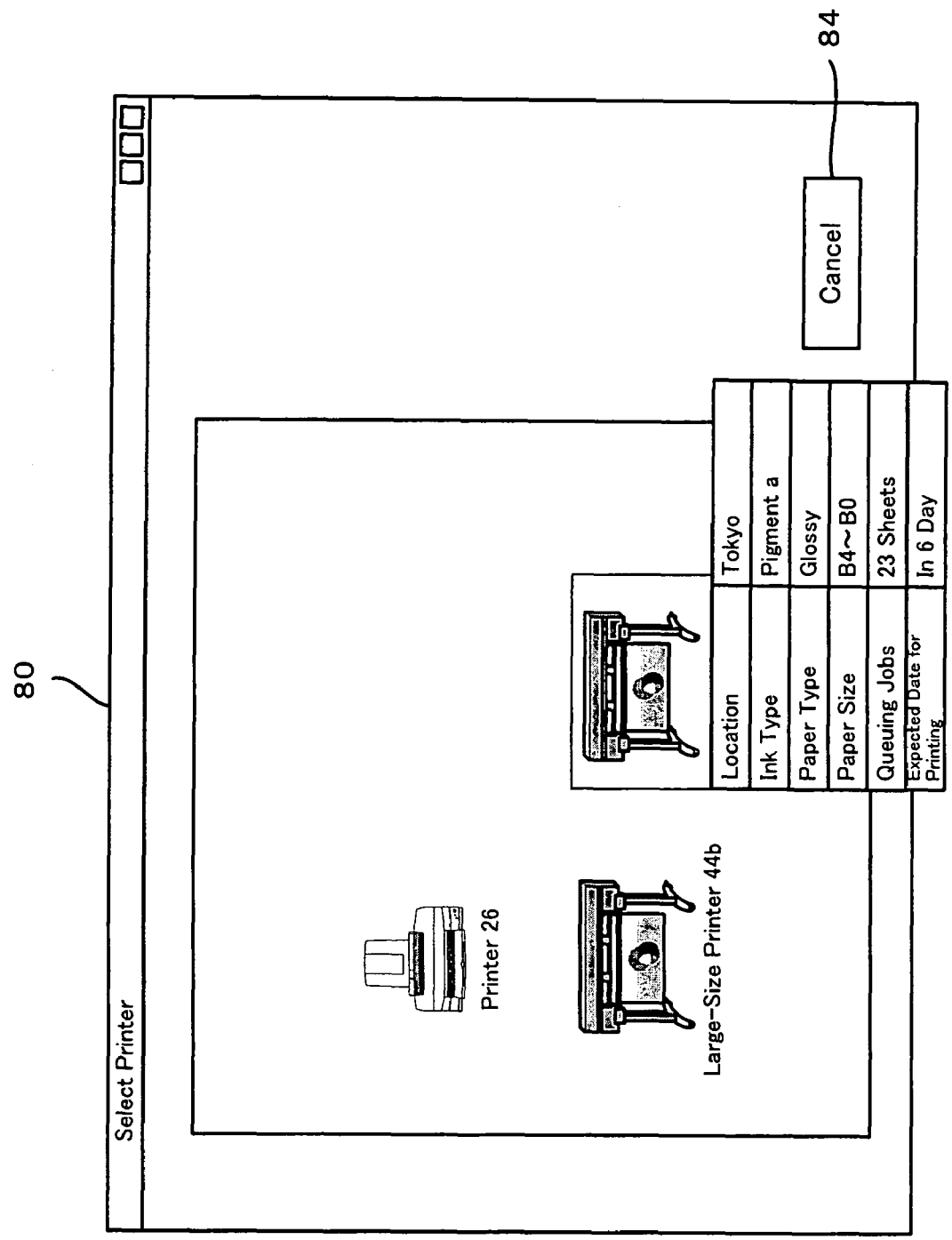
FIG. 10 shows the example of a print instruction window 80 with a window of properties of a printer.

As described previously, the printing device management server 36 manages the jurisdiction areas of the respective printing centers and the settings of the ink type, the paper type, and the paper size and the volume of queuing prints (queuing jobs) in each of the large-size printers 44*a* through 44*c*. Such data with regard to each of the retrieved available printers is displayable in the structure of this embodiment. For example, a right click on a printer icon with the mouse in the print instruction window 80 of FIG. 9 opens a window of properties 86 of the corresponding printer in the vicinity of the clicked printer icon as shown in FIG. 10. The properties 86 include the location of the printer, the settings of the ink type, the paper type, and the available paper sizes, the volume of the queuing jobs, and the expected date for printing. The expected date for printing is computed from the working time of the printer per day and the volume of the queuing jobs. The user 20 checks the properties 86 of the available printers for printing the selected image or the edited image and selects a desired printer among the available printers.

For example, a left click of a desired printer icon with the mouse in the print instruction window 80 of FIG. 9 may effectuate selection of the desired printer. When the user 20 selects the home printer 26 as the printer used for printing the object image on the print instruction window 80 (step S114), the routine settles an account for printing the object image with the home printer 26 (step S116) and gives a permission to execute printing with the home printer 26 (step S118). The image printing instruction routine is here terminated. For printing the object image with the home printer 26, the editor server 32 downloads an actual image of an input size from the actual image file server 34 to the computer 22, in response to selection of the home printer 26 on the print instruction window 80. The image editor 24 then outputs the downloaded actual image to the home printer 26.

When the user 20 selects a printer other than the home printer 26, for example, the large-size printer 44a, on the print instruction window 80 (step S114), on the other hand, the routine settles an account for printing the selected image or the edited image in the printing center (step S120) and receives a captured edited image as a check image and editing information, which includes the settings of editing parameters based on the operations of the editing buttons 61 through 67, the type of a selected template, and the paper size, from the image editor 24 (step S122). The input of the editing information is executed according to description of the Active X control. When the user clicks a non-illustrated button for selection of the center printing mode on completion of settlement of the account, the image editor 24 captures the edited layout image LG as a check image and outputs the captured check image and the settings of the editing parameters based on the operations of the editing buttons 61 through 69, the type of the selected template, and the paper size.

After input of the editing information, the routine sends the image ID of the object image to be printed and the editing information as a set of printing information to the printing computer 42a included in the image printing device 40a installed in the printing center where the printer selected by the user 20 (the large-size printer 44a in this example) is located (step S124). The image printing instruction routine is here terminated.

Figure 12:
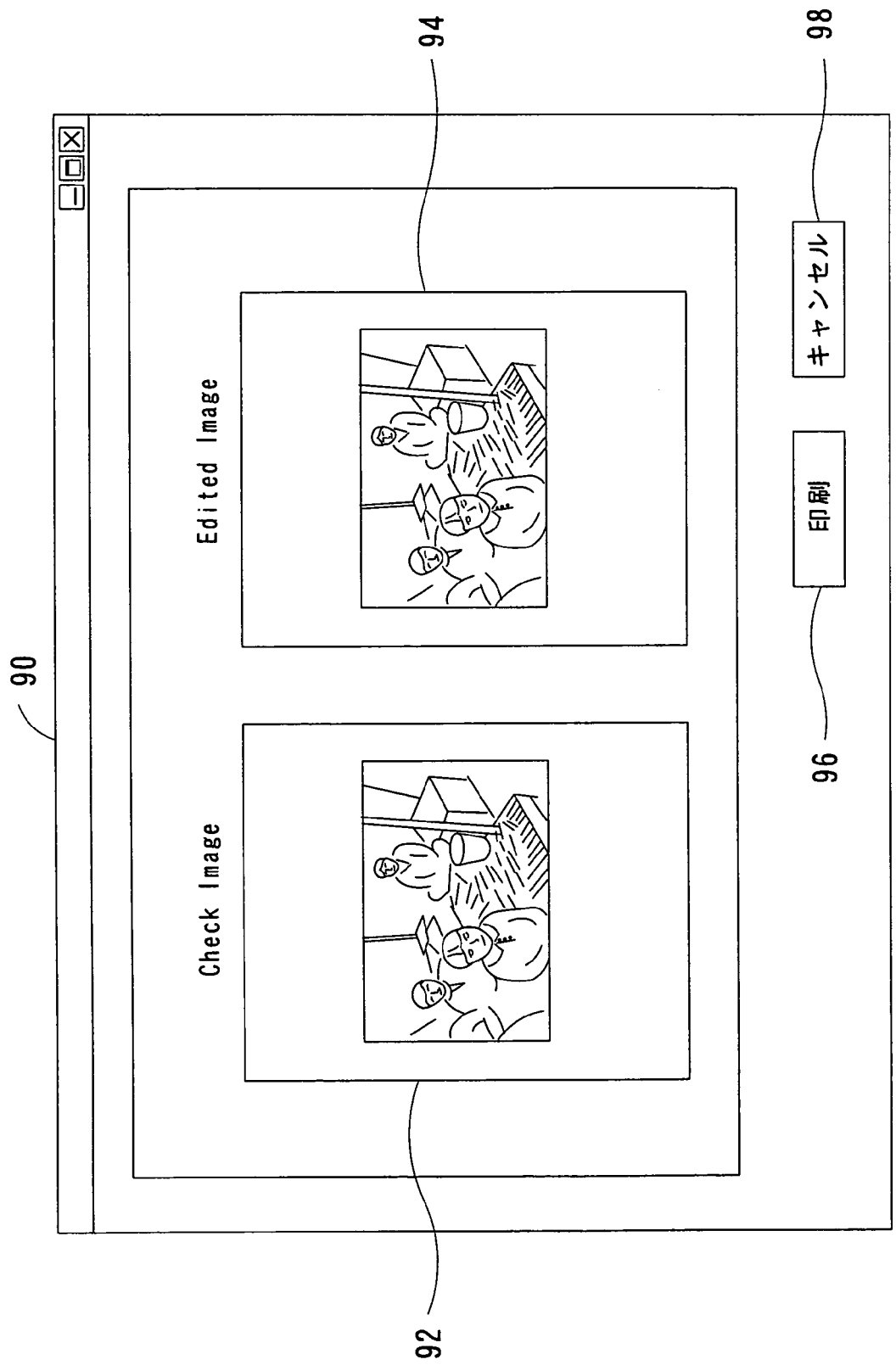
FIG. 12 shows a check window 90 displaying a resized edited image and a check image.

FIG. 10 is a flowchart showing an image printing routine executed by the selected one of the printing computers 42a through 42c included in the image printing devices 40a through 40c. The image printing routine first retrieves an object image to be edited and printed out of the actual image files stored in one of the external storage devices 43a through 43c corresponding to the selected one of the printing computers 42a through 42c, with the image ID included in the printing information and the paper size included in the editing information input from the image delivery device 30 as keys (step S200). The routine subsequently edits the retrieved object image with the settings of the editing parameters (step S202), creates a resized edited image by resizing the edited image to have an identical size with that of the check image (step S204), and displays the resized edited image and the check image included in the editing information on a display unit like a CRT (step S206). FIG. 12 shows a check window 90 displaying the resized edited image and the check image. In this illustrated example of FIG. 12, a check image 92 and a resized edited image 94 are displayed alongside on the check window 90. Such display enables the user 20 to check whether the image retrieved and edited by the selected one of the image printing devices 40a through 40c is identical to the image delivered to and edited by the user 20. The check window 90 also includes a 'Print' button 96 to print an adequate image and a 'Cancel' button 98 to cancel out an inadequate image.

In response to selection of the 'Print' button 96, for example, by mouse click, the image printing routine prints the edited image with the selected one of the large-size printers 44a through 44c (step S208) and is then terminated. In response to selection of the 'Cancel' button 98, on the other hand, the routine recognizes the edited image as inadequate and outputs the inadequacy to the Web server 31. The Web server 31 then notifies the user 20 of the inadequacy. Each resulting print by any of the large-size printers 44a through 44c is delivered to the user 20, that is, to the address included in the personal information of the user 20.

As described above, the image printing system 10 of the embodiment enables the user 20 to select a desired printer among available printers for printing the selected image or the edited image. The selected image or the edited image is thus printable with the desired picture quality demanded by the user 20. The image printing system 10 of the embodiment also allows the user 20 to check the statuses of the respective available printers prior to selection of a desired printer for printing. The user 20 can thus estimate how may days will be required for delivery of resulting prints.

The image printing system 10 of the embodiment activates the image editor 24 to capture the image edited by the user 20 as a check image and to include the check image in the editing information. The check image and a resized edited image for printing are displayed in a comparable manner, prior to printing by one of the image printing devices 40a through 40c. The user 20 can thus check the consistency of the edited image for printing with the image edited by the user 20. This arrangement effectively prevents an image edited differently from the requirements of the user 20 from being mistakenly printed due to some trouble or error.

In the image printing system 10 of the embodiment, the computer 22 sends the results of editing by the image editor 24 as editing information to the Web server 31, while not sending the edited image itself. Transmission of the editing information via the Internet 12 requires a significantly shorter time than transmission of the edited image itself via the Internet 12. The image printing system 10 of the embodiment edits a selected image of an adequate size corresponding to the input paper size with editing information and prints the edited image. This arrangement ensures the sufficiently high picture quality of the resulting printed image and the high degree of freedom in editing. Each of the image printing devices 40a through 40c in the printing center retrieves an object image of an adequate size out of the actual image files stored in the corresponding one of the external storage devices 43a through 43c, based on the image ID and the editing information output from the Web server 31, edits the retrieved image, and prints the edited image. The retrieved and edited image for printing may thus have a different size from the size of the image edited by the user 20.

Figure 13:
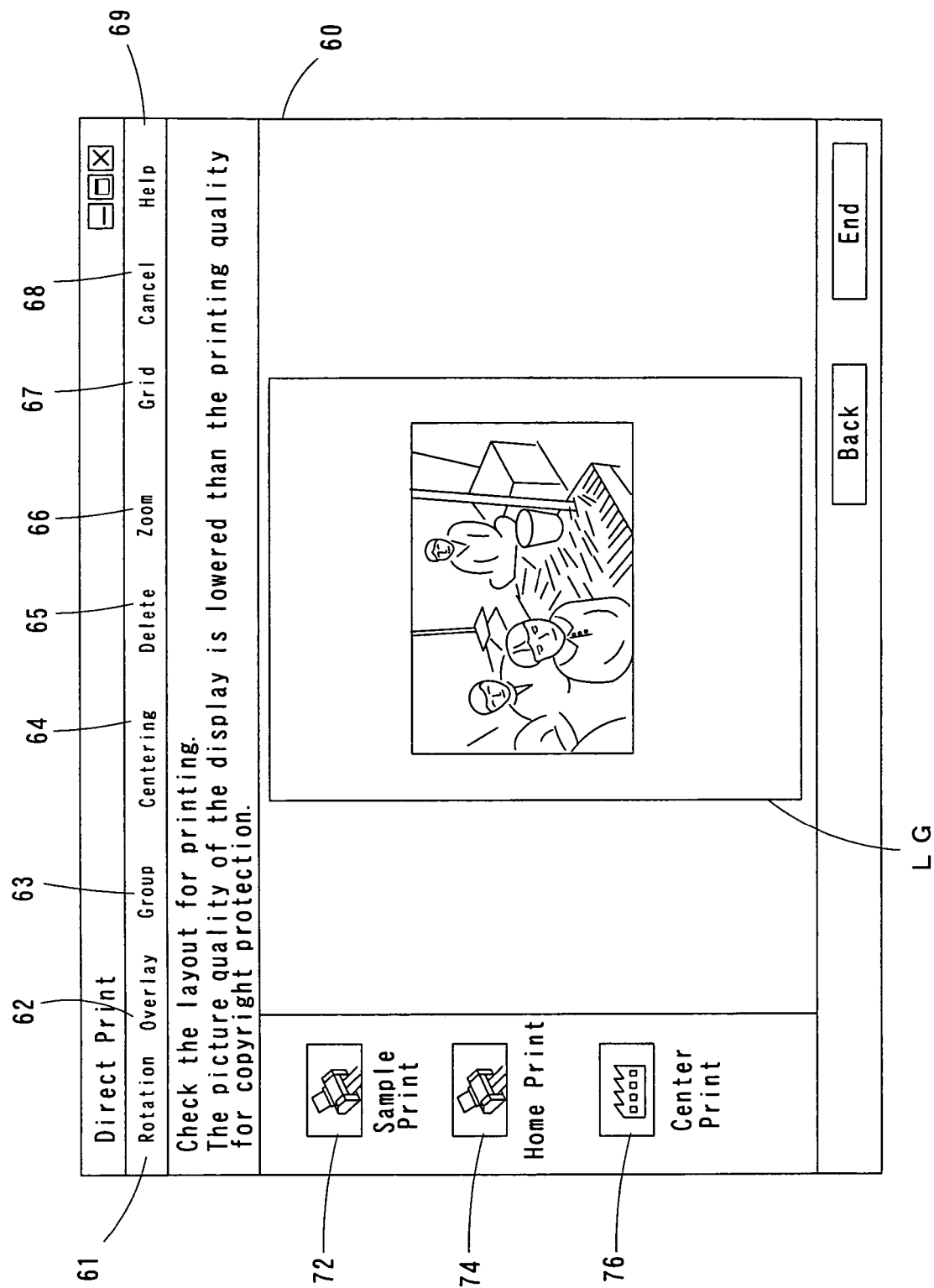
FIG. 13 shows an editing print window 60B in one modified structure.

The image printing system 10 of the embodiment displays the printer 26 of the user 20 as one of the available printers for printing the selected image or the edited image on the print instruction window 80, as long as the printer 26 satisfies the required conditions. Namely the printer 26 of the user 20 is treated equally with the large-size printers 44*a* through 44*c* in the printing centers. In one modified structure shown in FIG. 13, an editing print window 60B may include a 'Home Print' button 74B to select printing with the printer 26 of the user 20 and a 'Center Print' button 76B to select printing in one of the printing centers. The user is asked to select either home printing or center printing. In response to the user's selection of printing in the printing center, the modified procedure retrieves available printers for printing the selected image or the edited image only among the large-size printers 44*a* through 44*c* in the printing centers and displays the retrieved available printers on the print instruction window 80. When the selected paper size is suitable only for center printing, that is, the home printer 26 is incapable of printing the selected paper size, it is naturally preferable that the 'Home Print' button 74B is set inactive on the editing print window 60B.

The image printing system 10 of the embodiment retrieves available printers for printing the selected image or the edited image, based on the ink type suitable for printing the selected image or the edited image, the input paper size, and the postal address of the user 20, and displays a list of the retrieved available printers on the print instruction window 80. One possible modification may set an order to the retrieved available printers, based on the distances between the postal address of the user 20 and the respective printing centers and the volumes of the queuing jobs in the respective printers, and display the retrieved available printers in the preset order on the print instruction window 80. The user 20 can thus readily select a printer in the nearest printing center or a printer having the least volume of the queuing jobs.

The image printing system 10 of the embodiment displays the resized edited image for printing and the check image alongside, prior to printing by one of the image printing devices 40*a* through 40*c* in the respective printing centers. One modified procedure may print a check image in advance for comparison with an object image to be printed or a resized object image prior to printing. Another modified procedure may check the consistency of a resulting print by one of the image printing devices 40*a* through 40*c* in the printing centers with a check image, prior to delivery of the resulting print. In the latter case, the check image may be displayed on a display unit like a CRT or may be printed out with a printing device like a printer.

The image printing system 10 of the embodiment captures the layout image LG edited by the user 20 as a check image and includes the captured check image in the editing information. One possible modification may specify the edited layout image LG or its resized image as a check image and include the specified check image in the editing information.

Figure 14:
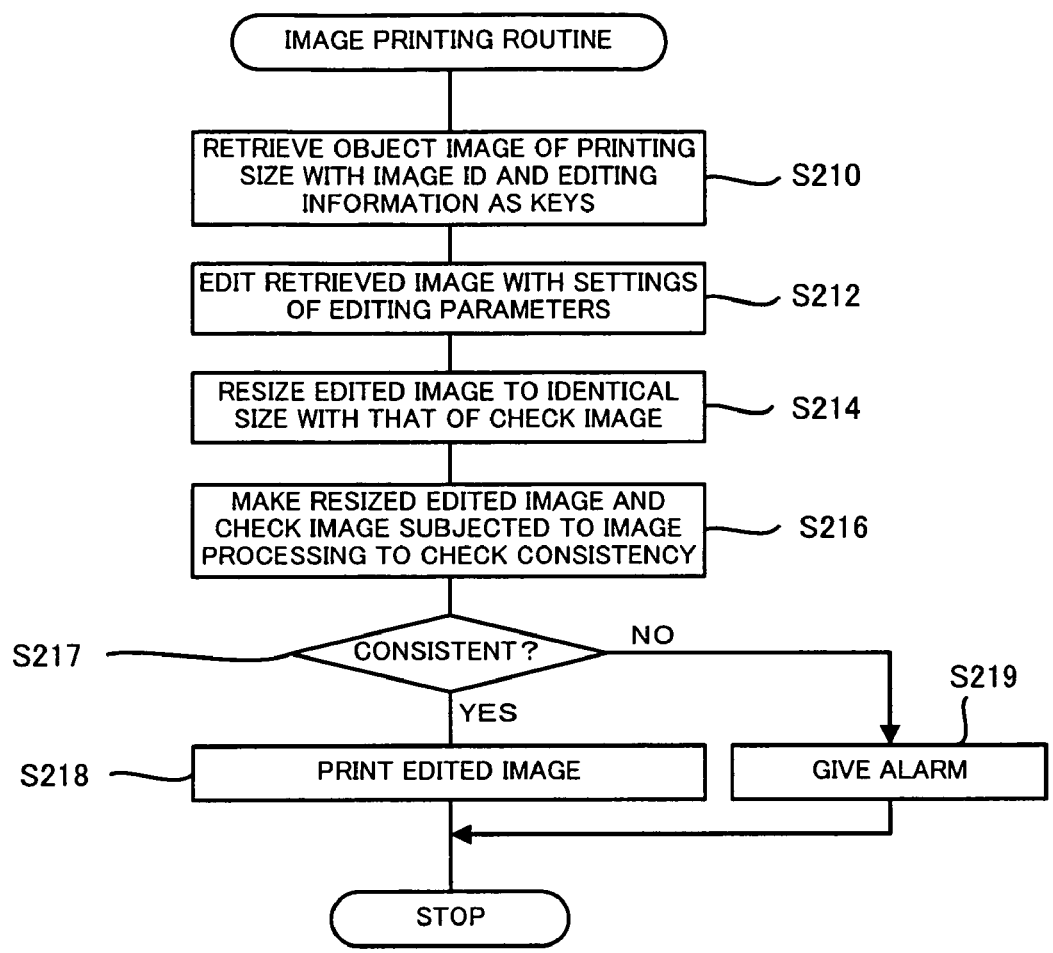
FIG. 14 is a flowchart showing an image printing routine in one modified structure.

The image printing system 10 of the embodiment captures an edited image by the user 20 as a check image and includes the captured check image in the editing information. The check image and a resized edited image for printing are then displayed in a comparable manner, prior to printing by the selected one of the image printing devices 40*a* through 40*c* in the respective printing centers. One modified procedure makes the resized edited image and the check image subjected to image processing to check the consistency. In this case, a modified image printing routine shown in the flowchart of FIG. 14 is executed instead of the image printing routine of FIG. 11. In the modified image printing routine of FIG. 14, each of the printing computers 42*a* through 42*c* corresponding to the selected one of the image printing devices 40*a* through 40*c* retrieves an object image to be edited and printed out of the actual image files stored in one of the external storage devices 43*a* through 43*c* corresponding to the selected one of the printing computers 42*a* through 42*c*, with the image ID included in the printing information and the paper size included in the editing information input from the image delivery device 30 as keys (step S210). The modified routine subsequently edits the retrieved object image with the settings of the editing parameters (step S212), creates a resized edited image by resizing the edited image to have an identical size with that of the check image (step S214), and makes the resized edited image and the check image subjected to image processing to check the consistency (step S216). One concrete procedure of checking the consistency generates difference data between the resized edited image and the check image, converts the difference data into tone data or binary data, and determines whether the tone data or binary data is in a preset allowable range of consistency. When determining consistency, the routine prints the edited image with the selected one of the large-size printers 44*a* through 44*c* (step S218). When determining inconsistency, on the other hand, the routine gives an alarm representing the inconsistency as a display on the screen or a print out (step S219). The modified image printing routine is then terminated. This modified procedure checks the consistency of the resized edited image with the check image and prints only the edited image determined as consistent. This arrangement prints only the edited image for printing that is consistent with the image edited by the user 20, while effectively preventing an image edited differently from the requirements of the user 20 from being mistakenly printed due to some trouble or error.

The image printing system of this modified arrangement gives an alarm when the resized edited image is inconsistent with the check image. Output of the alarm is, however, not essential and may be omitted when not required.

The following describes an image printing system 10B in a second embodiment of the invention. The image printing system 10B of the second embodiment has the same hardware configuration as that of the image printing system 20 of the first embodiment (the configuration shown in FIGS. 1 and 2). The hardware configuration of the image printing system 10B of the second embodiment is thus not specifically described here. The description of the second embodiment regards series of operations executed by the image printing system 10B of the second embodiment, especially a series of processing to print an image delivered by the Web server 31 and edited by the user 20 with one of the image printing devices 40*a* through 40*c* installed in the printing centers.

Figure 15:
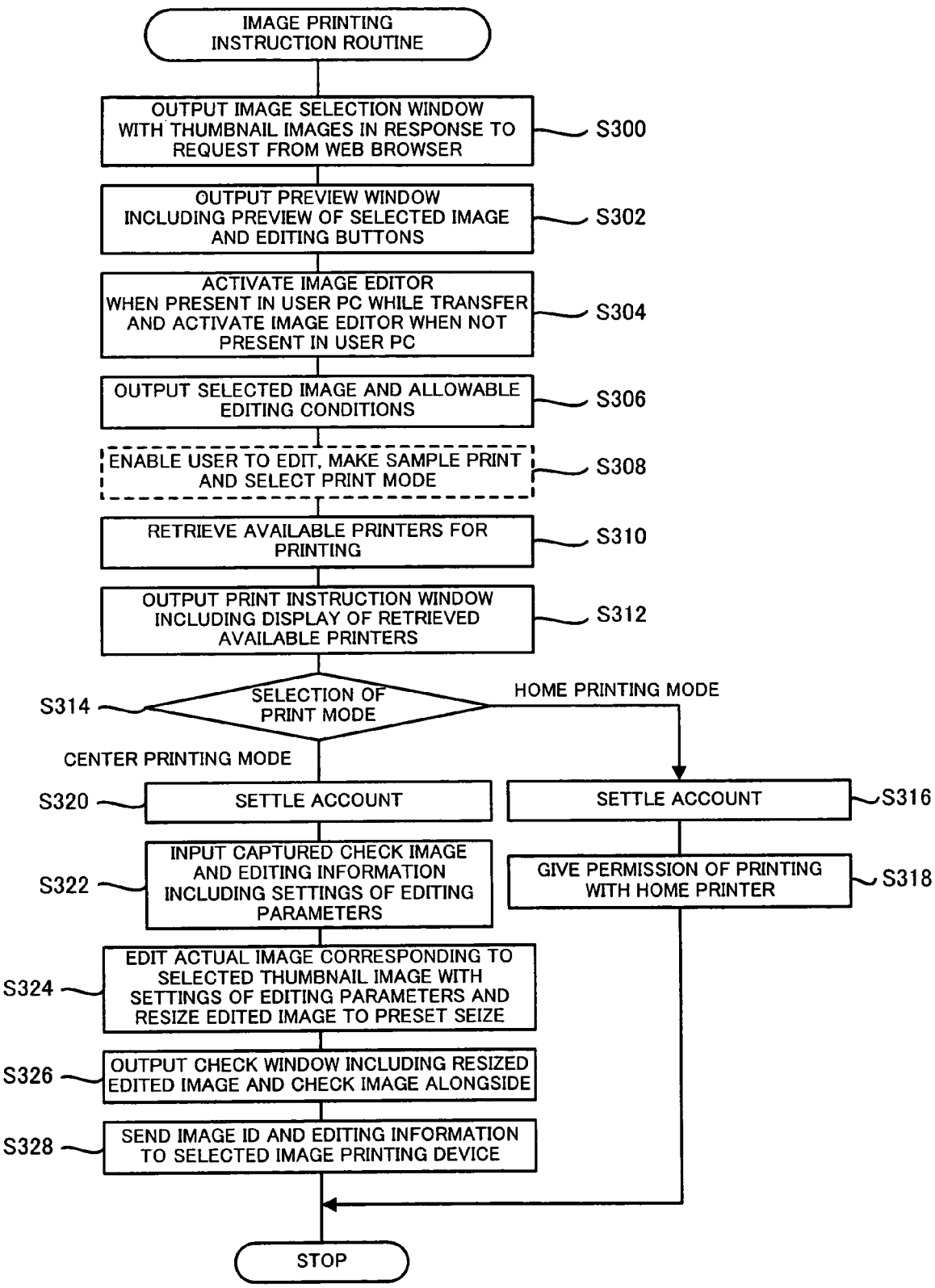
FIG. 15 is a flowchart showing an image printing instruction routine executed by the Web server 31 in an image printing system 10B of the second embodiment.

FIG. 15 is a flowchart showing an image printing instruction routine executed by the Web server 31 in the image printing system 10B of the second embodiment. As in the case of the image printing system 20 of the first embodiment, this image printing instruction routine starts in response to a request from the Web browser 23 in the computer 22 of the user 20 via the Internet 12. The processing of steps S300 to S322 in this image printing instruction routine is identical with the processing of steps S100 to S122 in the image printing instruction routine of FIG. 3 executed by the image printing system 20 of the first embodiment. The processing of and after step S324 is thus mainly described here in the image printing instruction routine executed in the image printing system 10B of the second embodiment. FIGS. 4 through 10 referred to in the description of the processing of steps S100 to S122 are also applicable to the processing of steps S300 to S322.

Figure 16:
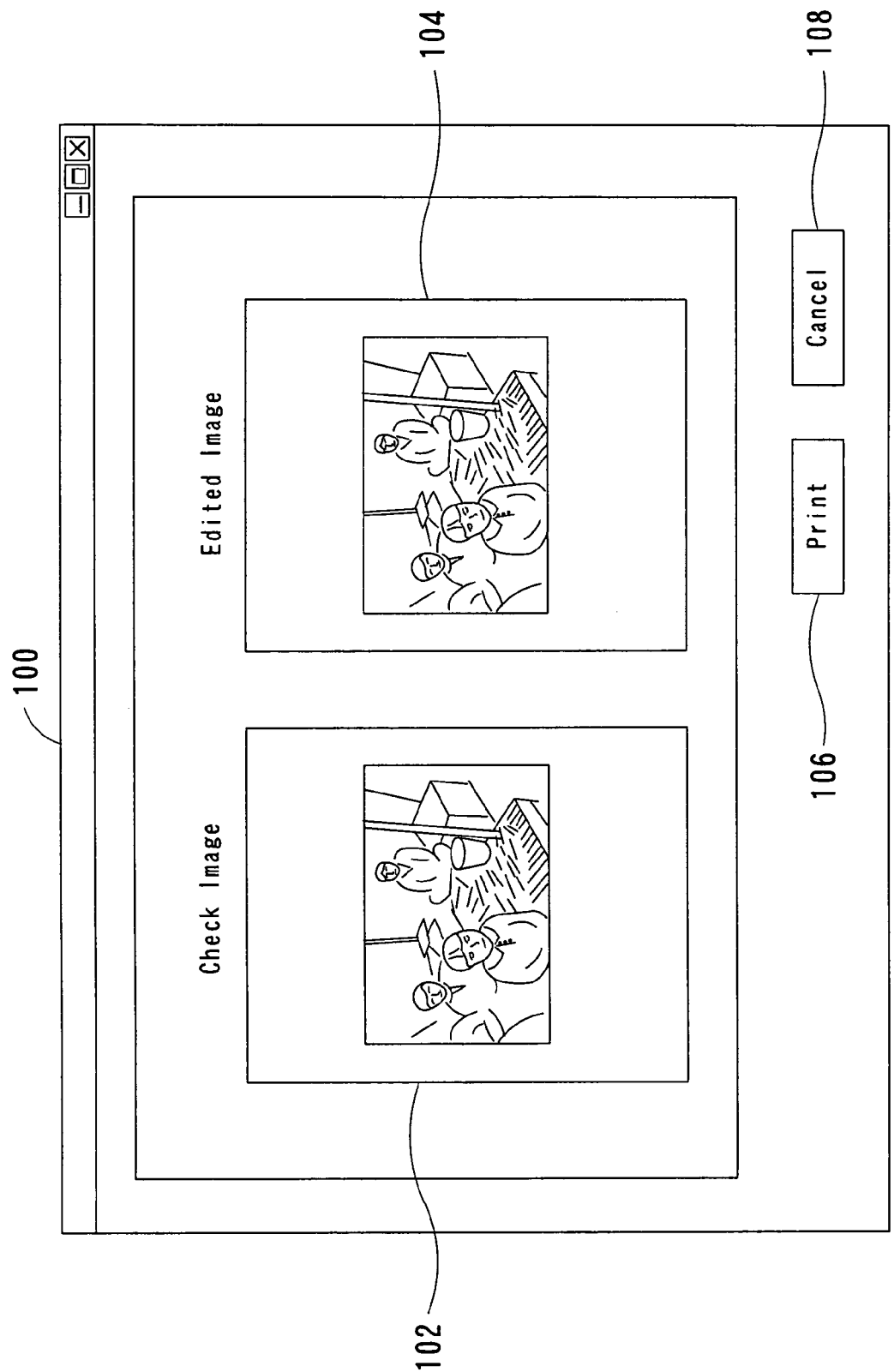
FIG. 16 shows a check window 100 displaying a check image and a resized edited image.

In the image printing instruction routine of FIG. 15, when the user 20 selects one of the printers in the printing centers, for example, the large-size printer 44*a*, on the print instruction window 80 displayed at step S312 (step S314), the routine settles an account for printing the edited image in the printing center (step S320) and receives a captured edited image as a check image and editing information, which includes the settings of the editing parameters based on the operations of the editing buttons 61 through 69, the type of the selected template, and the paper size, from the image editor 24 (step S322). The routine then edits an actual image of an adequate size for printing, which corresponds to the thumbnail image selected at step S300, with the input settings of the editing parameters and resizes the edited image to an identical size with that of the check image (step S324) and outputs a check window 100 including the resized edited image and the input check image to the Web browser 23 (step S326). One example of the check window 100 is shown in FIG. 16. In this illustrated example of FIG. 16, a check image 102 and a resized edited image 104 are displayed alongside on the check window 100. Such display enables the user 20 to check whether the image edited by the Web server 31 is identical to the image delivered to and edited by the user 20. The check window 100 also includes a 'Print' button 106 to print an adequate image and a 'Cancel' button 108 to cancel out an inadequate image.

When it is confirmed that the image edited by the Web server 31 is identical to the image edited by the user 20, the image printing instruction routine sends the image ID of the object image to be edited and printed and the editing information as a set of printing information to the printing computer 42a included in the image printing device 40a installed in the printing center where the selected large-size printer 44a in this example is located (step S328) and is then terminated.

Figure 11:
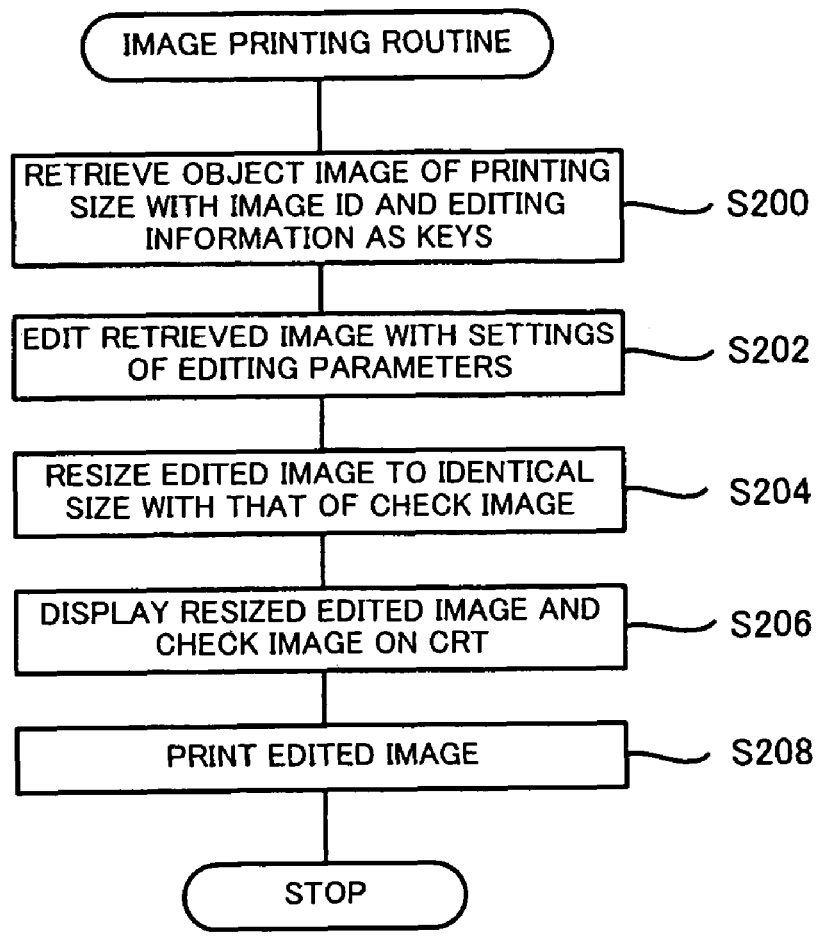
FIG. 11 is a flowchart showing an image printing routine executed by printing computers 42a through 44a, which are respectively included in multiple image printing devices 40a through 40c installed in printing centers.

Each of the image printing devices 40a through 40c installed in the respective printing centers in the image printing system 10B of the second embodiment executes an image printing process, which is identical to the image printing process of FIG. 11 executed by each of the image printing devices 40a through 40c installed in the respective printing centers in the image printing system 20 of the fist embodiment. No detailed explanation is thus given here with regard to the image printing process executed by each of the image printing devices 40a through 40c in the respective printing centers. An edited image with the settings of the editing parameters by each of the image printing devices 40a through 40c in the respective printing centers is identical to an edited image with the settings of the editing parameters by the Web server 31.

As described above, the image printing system 10B of the second embodiment outputs the check window 100 to the user's Web browser 23. The check window 100 includes a resized edited image obtained by editing an actual image of an adequate size for printing with the user's settings of the editing parameters and resizing the edited image and a check image obtained by capturing an edited image by the user 20. The user 20 is thus allowed to check whether the edited image is identical to the check image. This arrangement effectively prevents an image edited differently from the requirements of the user 20 from being mistakenly printed due to some trouble or error.

In the image printing system 10B of the second embodiment, the computer 22 sends the results of editing by the image editor 24 as editing information to the Web server 31, while not sending the edited image itself. Transmission of the editing information via the Internet 12 requires a significantly shorter time than transmission of the edited image itself via the Internet 12. The image printing system 10 of the embodiment edits a selected image of an adequate size corresponding to the input paper size with editing information and prints the edited image. This arrangement ensures the sufficiently high picture quality of the resulting printed image and the high degree of freedom in editing. Each of the image printing devices 40a through 40c in the printing center retrieves an object image of an adequate size out of the actual image files stored in the corresponding one of the external storage devices 43a through 43c, based on the image ID and the editing information output from the Web server 31, edits the retrieved image, and prints the edited image. The retrieved and edited image for printing may thus have a different size from the size of the image edited by the user 20. The image printing system 10B of the second embodiment enables the user 20 to select a desired printer among available printers for printing the selected image or the edited image. The selected image or the edited image is thus printable with the desired picture quality demanded by the user 20. The image printing system 10B of the second embodiment also allows the user 20 to check the statuses of the respective available printers prior to selection of a desired printer for printing. The user 20 can thus estimate how may days will be required for delivery of resulting prints.

Figure 17:
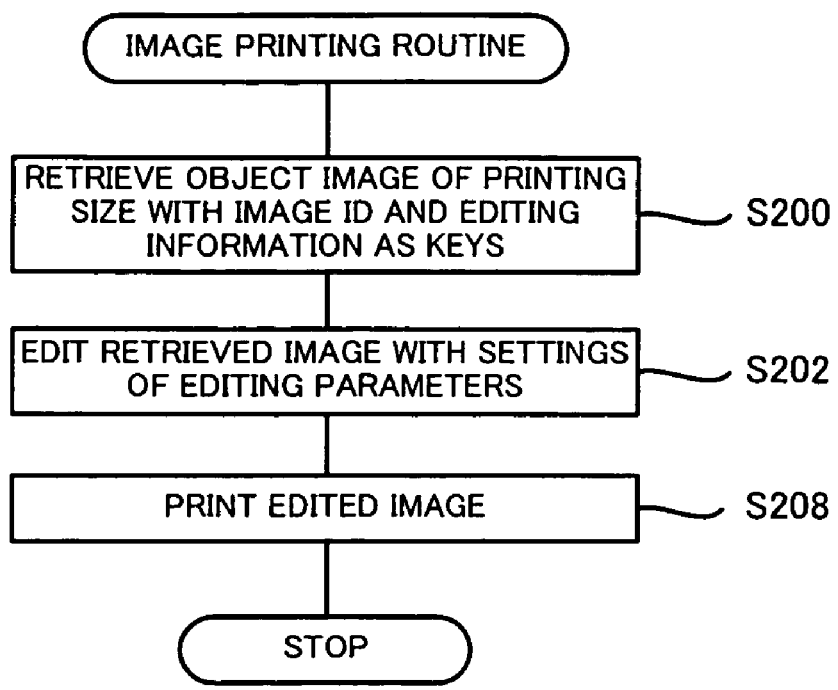
FIG. 17 is a flowchart of an image printing routine in one modified structure.

In the image printing system 10B of the second embodiment, each of the image printing devices 40a through 40c installed in the respective printing centers executes the image printing process identical with the image printing process executed by each of the image printing devices 40a through 40c installed in the respective printing centers in the image printing system 20 of the fist embodiment. Since it has already been confirmed that the edited image for printing is identical to the check image, the process of resizing the edited image at step S204 and the process of displaying the check window 90 including the resized edited image and the check image on the CRT at step S206 may be omitted from the image printing routine of FIG. 11, as shown in a modified image printing routine of FIG. 17. This modified image printing routine retrieves an object image, edits the object image with the input settings of the editing parameters, and then immediately prints the edited image with the selected one of the large-size printers 44a through 44c. In this modified application, the check image may be omitted from the printing information, which is sent from the Web server 31 to the selected one of the printing computers 42a through 42c of the image printing devices 40a through 40c in the respective printing centers.

Figure 18:
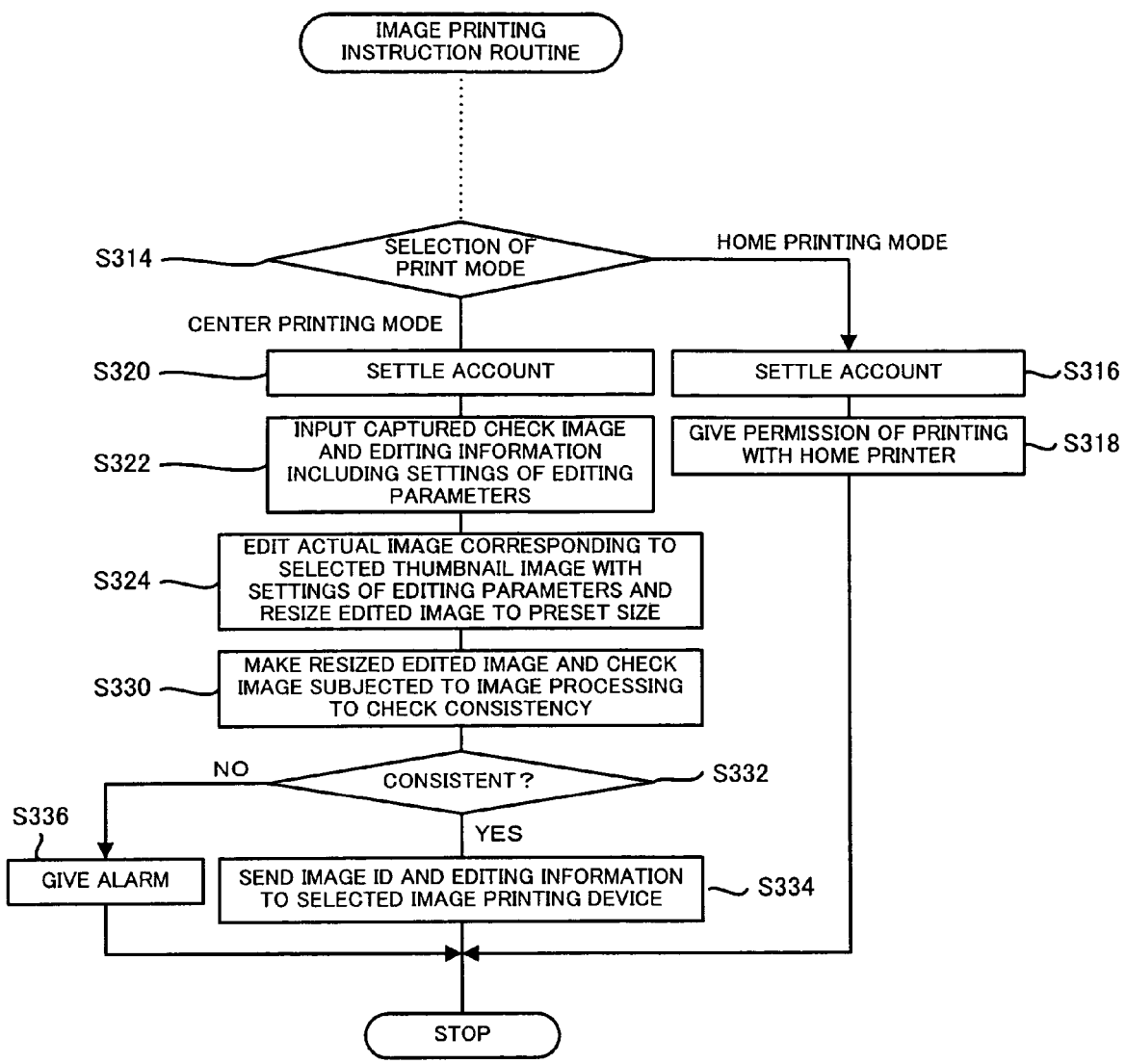
FIG. 18 is a flowchart showing an image printing instruction routine in one modified structure.

The image printing system 10B of the second embodiment outputs the check window 100, which includes the resized edited image obtained by editing the actual image of the adequate size for printing with the user's settings of the editing parameters and resizing the edited image and the check image obtained by capturing the edited image by the user 20, to the user's Web browser 23. The user 20 is thus allowed to check whether the edited image is identical to the check image. One possible modification may cause the image edited and resized by the Web server 31 and the check image to be subjected to image processing and check their consistency. In this case, an image printing instruction routine shown in the flowchart of FIG. 18 is executed instead of the image printing instruction routine of FIG. 15. The processing of steps S300 through S326 in this modified routine is identical with the processing of steps S300 through S326 shown in the routine of FIG. 15 and is thus partly omitted from the flowchart of FIG. 18. The following description mainly regards the processing of and after step S330, which is characteristic of this modification and is different from the image printing instruction routine of FIG. 15.

The Web server 31 edits an actual image of an adequate size for printing with the input settings of the editing parameters and resizes the edited image to an identical size with that of the check image (step S326) and makes the resized edited image and the check image subjected to image processing to check the consistency (steps S330 and S332). The method of checking the consistency in the image printing routine of FIG. 12 as one modified example of the first embodiment is also applied to check the consistency in this image printing instruction routine. When determining consistency, the routine sends the image ID of the object image to be edited and printed and the editing information as a set of printing information to the printing computer 42a included in the image printing device 40a installed in the printing center where the selected large-size printer (the large-size printer 44a in this example) is located (step S334). When determining inconsistency, on the other hand, the routine gives an alarm representing the inconsistency to the Web browser 23 (step S336). The modified image printing instruction routine is then terminated. This modified procedure checks the consistency of the resized edited image with the check image and sends the printing information to the corresponding one of the image printing devices 40a through 40c in the printing center where the selected printer is located, based on the result of consistency check. This arrangement prints only the edited image for printing that is consistent with the image edited by the user 20, while effectively preventing an image edited differently from the requirements of the user 20 from being mistakenly printed due to some trouble or error.

The image printing system of this modified arrangement gives an alarm when the resized edited image is inconsistent with the check image. Output of the alarm is, however, not essential and may be omitted when not required.

In the image printing system 10 of the first embodiment, the image printing system 10B of the second embodiment, and their modified structures, the external storage devices 43a through 43c of the printing computers 42a through 42c in the respective printing centers store actual image files, which are identical to the actual image files stored in the actual image file server 34. The procedure then retrieves an object image to be printed with the image ID and the editing information output from the Web server 31 as keys, edits the retrieved image, and prints the edited image. In one modified structure, the image printing devices 40a through 40c in the respective printing centers may not store the actual image files. In this modified structure, the procedure retrieves an actual image of an adequate size for printing in the actual image file server 34 and outputs the retrieved image and the editing information to the corresponding one of the printing computers 42a through 42c of the image printing devices 40a through 40c in the printing center where the selected printer is located. The corresponding one of the printing computers 42a through 42c inputs the retrieved image and the editing information, edits the input image, and prints the edited image.

In the image printing system 10 of the first embodiment, the image printing system 10B of the second embodiment, and their modified structures, the print instruction window 80 is displayed to allow the user 20 to select a desired printer among available printers for printing the image selected or edited by the user 20. The check window 90 is displayed on the selected one of the printing computers 42a through 42c for comparison between a resized edited image for printing and a check image obtained by capturing an edited image by the user 20, prior to printing by the corresponding one of the image printing devices 40a through 40c in the printing center where the selected printer is located. The check window 100 is displayed on the computer 22 of the user 20 for comparison between a resized edited image for printing and a check image obtained by capturing an edited image by the user 20, prior to transmission of the editing information and the image ID to the printing center where the selected printer is located. Such display is, however, not essential. The display of the print instruction window 80 may be omitted. The display of the check window 90 on the selected one of the printing computers 42a through 42c in the printing center may be omitted. The display of the check window 100 on the computer 22 of the user 20 may be omitted.

In the image printing system 10 of the first embodiment, the image printing system 10B of the second embodiment, and their modified structures, the image editor 24 carries out contraction, expansion, rotation, combination, overlay, variation in aspect ratio, and free layout as image editing specifications. The image editor 24 may combine another image possessed by the user 20 with a layout image LG delivered from the Web server 31. In this case, a subject image to be combined and position data representing the combining position relative to the layout image LG are included in the editing information output from the image editor 24 to the Web server 31. This arrangement further enhances the degree of freedom in editing by the user 20.

In the image printing system 20 of the first embodiment, the image printing system 10B of the second embodiment, and their modified structures, the image delivery device 30 includes the Web server 31, the editor server 32, the authoring server 33, the actual image file server 34, the database server 35, and the printing device management server 36. In one possible modification, the Web server 31 may have the functions of all the other servers. Namely the image delivery device 30 may be actualized by one single computer.

In the image printing system 20 of the first embodiment, the image printing system 10B of the second embodiment, and their modified structures, the image editor 24 as the user's application software takes charge of editing the selected image. The image editor 24 is downloaded from the Web server 31 to the computer 22 of the user 20 and carries out delivery, editing, and printing of images under management of the image delivery device 30. In one possible modification, a Web page, which carries out editing and printing of images under management of the image delivery device 30, may take charge of editing the selected image.

In the image printing system 20 of the first embodiment, the image printing system 10B of the second embodiment, and their modified structures, the image printing devices 40a through 40c installed in the respective printing centers are connected to the image delivery device 30 via the LAN 38. The image printing devices 40a through 40c installed in the respective printing centers may be connected to the image delivery device 30 via a communication network like the Internet 12.

In the image printing system 20 of the first embodiment, the image printing system 10B of the second embodiment, and their modified structures, one selected image printing device among the multiple image printing devices 40a through 40c in the multiple printing centers edits and prints images. There may be, however, one single image printing device in one single printing center that edits and prints images. In this case, the image delivery device 30 and the image printing device may not be separate units but may be constructed as an integrated unit.

The embodiments and their modified examples discussed above regard the image printing system, as well as the image delivery device and the image printing device included in the image printing system. As mentioned previously, the Web server may have the functions of all the other servers in the image delivery device. The image delivery device may thus be actualized by one single computer. Another possible application of the invention is a program that causes a computer to function as the image delivery device. In this program application, the respective steps of the image printing instruction process and the image printing process discussed above are attained by the respective programmed steps.

INDUSTRIAL APPLICABILITY

The technique of the invention is applicable to industries relating to the image delivery technology and the image printing technology using communication networks.

What is claimed is:

1. An image printing system, comprising: an image delivery device that connects with a client computer linked to a printer via a communication network and delivers an image to the client computer; and an image printing device that connects with said image delivery device via the communication network and has a large-size printer, said image delivery device comprising: an image storage module that stores multiple images in a first size suitable for printing with the printer linked to the client computer and multiple resized images, which are obtained by resizing the multiple images to a second size smaller than the first size, with identification information; a selected image receiving module that outputs an image selection window, which displays the multiple resized images stored in said image storage module in a selectable manner to allow for selection by the client computer, to the client computer and receives selection of a selected image on the image selection window from the client computer; an information image receiving module that receives editing information with regard to editing of the selected image form the client computer, as well as a captured image obtained by capturing the selected image edited by the client computer as a check image; a printing condition receiving module that receives printing conditions, which include a print mode selection condition of selecting either a home print mode to print the selected image received by said selected image receiving module with the printer linked to the client computer or a delivery print mode to print the selected image with the large-size printer of said image printing device and to deliver the printed image; and an image delivery transmission module that delivers an image in the first size corresponding to the selected image to the client computer, in the case of setting the home print mode to the print mode selection condition out of the printing conditions received by said printing condition receiving module, while sending identification information, the printing conditions, the editing information and the check image with regard to an image corresponding to the selected image to said image printing device, in the case of setting the delivery print mode to the print mode selection condition out of the printing conditions received by said printing condition receiving module, said image printing device comprising: an image storage module that stores multiple images in a third size greater than the first size and suitable for printing with the large-size printer, which are identical to the multiple images in the first size, with identification information; and a print control module that controls a printing operation, in response to reception of identification information, printing conditions, the editing information and the check image from said image delivery transmission module of said image delivery device, to edit an object image, which is specified by the received identification information, out of the multiple images stored in said image storage module, with the editing information sent from said image delivery transmission module of said image delivery device to prepare a printing image, to output the check image and a resized printing image, which is obtained by resizing the prepared printing image to an identical size with that of the check image, in a comparable manner as either a display on one screen page or a printout on one sheet of printing paper, and to print the edited object image under the received printing conditions with the large-size printer, in response to a print confirmation in answer to the output in the comparable manner;

wherein said image delivery device is connected to plurality of said image printing devices via the communication network, and said image delivery device further comprises: a printer retrieval module that retrieves available printers for printing the selected image, out of plurality of large-size printers included in the plurality of said image printing devices and the printer linked with the client computer; and a printer acceptance module that outputs a printer selection window to the client computer to display a list of the retrieved available printers and a location and an expected date for printing of at least one of the retrieved available printers, in a selectable manner to allow for selection by the client computer and accepts selection of a selected printer on the printer selection window from the client computer, said printing condition receiving module of said image delivery device sets the print mode selection condition according to the selected printer accepted by said printer acceptance module, and said image delivery transmission module of said image delivery device carries out delivery or transmission to print the selected image with the selected printer accepted by said printer acceptance module.

2. An image printing system in accordance with claim 1, wherein said image delivery transmission module of said image delivery device distributes a sample print image, which includes the image in the first size corresponding to the selected image and a specified character string, mark, or image, to the client compute, in the case of setting the home print mode to the print mode selection condition out of the printing conditions received by said printing condition receiving module, and subsequently delivers the image in the first size to the client computer in response to a request from the client computer.

3. An image printing system in accordance with claim 1, wherein said image delivery device further comprises: a program storage module that stores a printing program, which is downloaded into the client computer and is automatically installed therein to control printing of a delivered image with the printer linked to the client computer in response to an instruction from said image delivery device; and a download control module that controls download of the printing program into the client computer after reception of the selected image by said selected image receiving module but prior to delivery of the image in the first size corresponding to the selected image by said image delivery transmission module to the client computer.

4. An image printing system in accordance with claim 3, wherein the printing program is capable of editing an image.

5. An image printing system in accordance with claim 3, wherein the printing program is used to enter printing conditions with regard to the selected image.

6. An image printing system, comprising: an image delivery device that connects with a client computer linked to a printer via a communication network and delivers an image to the client computer; and an image printing device that connects with said image delivery device via the communication network and has a large-size printer, said image delivery device comprising: an image storage module that stores multiple images in a first size and multiple resized images, which are obtained by resizing the multiple images to a second size smaller that the first size, with identification information; a selected image receiving module that outputs an image selection window, which displays the multiple resized images stored in said image storage module in a selectable manner to allow for selection by the client computer, to the client computer and receives selection of a selected image on the image selection window from the client computer; a printing condition receiving module that receives printing conditions, which include a print mode selection condition of selecting either a home print mode to print the selected image received by said selected image receiving module with the printer linked to the client computer or a delivery print mode to print the selected image with the large-size printer of said image printing device and to deliver the printed image; and an image delivery transmission module that delivers an image in the first size corresponding to the selected image to the client computer, in the case of setting the home print mode to the print mode selection condition out of the printing conditions received by said printing condition receiving module, while sending identification information and the printing conditions with regard to an image corresponding to the selected image to said image printing device, in the case of setting the delivery print mode to the print mode selection condition out of the printing conditions received by said printing condition receiving module, said image printing device comprising: an image storage module that stores multiple images in a third size greater than the first size, which are identical to the multiple images in the first size, with identification information; and a print control module that controls a printing operation, in response to reception of identification information and printing conditions from said image delivery transmission module of said image delivery device, to print an object image specified by the received identification information, out of the multiple images stored in said image storage module, under the received printing conditions with the large-size printer, wherein said image delivery device further comprises: information image receiving module that receives editing information with regard to editing of the selected image from the client computer, as well as a captured image obtained by capturing the selected image edited by the client computer as a check image; a printing image preparation module that edits the object image, which is specified by the received identification information, with the editing information to prepare a printing image; and a check image output module that outputs a check window including the prepared printing image and the received check image to the client computer, and said image delivery transmission module of said image delivery device, in response to a confirmation from the client computer on the check window output from said check image output module to the client computer, delivers the image in the first size corresponding to the selected image to the client computer or sends the identification information and the printing conditions with regard to the image corresponding to the selected image to said image printing device, based on the printing conditions received by said printing condition receiving module;

wherein said image delivery device is connected to plurality of said image printing devices via the communication network, and said image delivery device further comprises: a printer retrieval module that retrieves available printers for printing the selected image, out of plurality of large-size printers included in the plurality of said image printing devices and the printer linked with the client computer; and a printer acceptance module that outputs a printer selection window to the client computer to display a list of the retrieved available printers and a location and an expected date for printing of at least one of the retrieved available printers, in a selectable manner to allow for selection by the client computer and accepts selection of a selected printer on the printer selection window from the client computer, said printing condition receiving module of said image delivery device sets the print mode selection condition according to the selected printer accepted by said printer acceptance module, and said image delivery transmission module of said image delivery device carries out delivery or transmission to print the selected image with the selected printer accepted by said printer acceptance module.

7. An image printing system in accordance with claim 6, wherein said image delivery transmission module of said image delivery device sends the editing information and the check image, in addition to the identification information and the printing conditions with regard to the image corresponding to the selected image, to said image printing device, in the case of setting the delivery print mode to the print mode selection condition out of the printing conditions received by said printing condition receiving module, said print control module of said image printing device edits the object image, which is specified by the received identification information, with the editing information sent from said image delivery transmission module of said image delivery device to prepare a printing image, outputs the prepared printing image and the received check image in a comparable manner, and controls a printing operation, in response to a print confirmation in answer to the output in the comparable manner, to print an identical image to the prepared printing image under the received printing conditions with the large-size printer.

* * * * *